United States Patent [19]
Anderson

[11] Patent Number: 4,707,793
[45] Date of Patent: Nov. 17, 1987

[54] METHOD OF DETERMINING FEED RATE AND CUTTING SPEED FOR CUTTING METAL AND OF PREDICTING CUTTING EFFECTS

[75] Inventor: David A. Anderson, Sumner, Wash.

[73] Assignee: The Boeing Company, Seattle, Wash.

[21] Appl. No.: 782,270

[22] Filed: Sep. 30, 1985

[51] Int. Cl.$^4$ .................. G06F 15/46; G05B 13/00
[52] U.S. Cl. ................................ 364/474; 318/571
[58] Field of Search ............. 364/474, 475; 318/571, 318/561, 332

[56] References Cited

U.S. PATENT DOCUMENTS

| | | | |
|---|---|---|---|
| 3,548,172 | 12/1970 | Centner et al. | 235/151.11 |
| 3,784,798 | 1/1974 | Beadle et al. | 235/151.11 |
| 4,031,368 | 6/1977 | Colding et al. | 235/151.11 |
| 4,078,195 | 3/1978 | Mathias | 318/571 |
| 4,208,718 | 6/1980 | Chung | 364/474 |
| 4,346,444 | 8/1982 | Schneider | 364/475 |
| 4,509,126 | 4/1985 | Olig | 318/571 |
| 4,513,381 | 4/1985 | Houser | 364/475 |
| 4,628,459 | 12/1986 | Shinohara | 364/475 |

Primary Examiner—Jerry Smith
Assistant Examiner—Allen MacDonald
Attorney, Agent, or Firm—Joan H. Pauly

[57] ABSTRACT

A first set of parameters, including a preliminary cutting speed and a preliminary feed rate, is determined from the characteristics of the material to be cut, the cut to be made, the cutter, and the cutting machine. The hardness of the metal to be cut is coverted into Brinell hardness. The maximum allowable cutter force and a base cutting speed are calculated. The cutter force is the minimum of the maximum machine spindle side load and the forces required to: break the cutter at its shank, break the cutter at its flutes, and fracture the teeth. The maximum feed rate is calculated as the minimum of the maximum rates for: the desired surface finish, the maximum available horsepower, and the maximum force available. These calculation include correcting the maximum allowable cutter force and the maximum feed rate for fixture condition and machine condition and converting machine rate horsepower into spindle horsepower. Preferably, further calculations of cutting effects are made, including cutter deflection, actual cutting force, estimated tool life, and estimated surface finish. These effects may also be calculated separately using preset cutting speeds and feed rates.

32 Claims, 11 Drawing Figures

INPUT DATA

| | | |
|---|---|---|
| Aaa | = | TYPE OF ALUMINUM |
| Adc | = | AXIAL DEPTH OF CUT |
| Cdir | = | CUT DIRECTION 1=CLIMB 2=CONVENTIONAL |
| Cutfl | = | COOLANT 1=WATER SOLUBLE 2=DRY |
| Cutmat | = | CUTTER MATERIAL 1=H.S.S. 2=COBALT 3=CARBIDE |
| Cut-type | = | TYPE OF CUT 1=SLOT 2=SLAB 3=FACE 4=PERIPHERY |
| D | = | CUTTER DIAMETER |
| Ds | = | CUTTER SHANK DIAMETER |
| Fix | = | FIXTURE CONDITION 1-10 (RIGID) |
| Fl | = | CUTTER FLUTE LENGTH |
| Helex | = | CUTTER HELICAL ANGLE |
| Ksi | = | PART HARDNESS KSI |
| Mac | = | MACHINE TYPE |
| Macc | = | MACHINE CONDITION 1-10 (RIGID) |
| Mhp | = | MACHINE RATED HORSEPOWER |
| Mrpm | = | MACHINE MAX REVOLUTIONS PER MINUTE |
| Mt | = | PART MATERIAL 1=ALUMINUM 2=ALLOY STEEL 3=TITANIUM 4=STAINLESS |
| N | = | CUTTER NUMBER OF TEETH |
| Oal | = | CUTTER OVERALL LENGTH |
| Rad | = | NOSE RADIUS OF CUTTER TEETH |
| Rdc | = | RADIAL DEPTH OF CUT |
| Rk | = | CUTTER RAKE ANGLE |
| Spld | = | SPINDLE SIDE LOAD (MAX. FORCE) |
| Surf | = | SURFACE FINISH 1=ROUGHING 2=FINISHING |

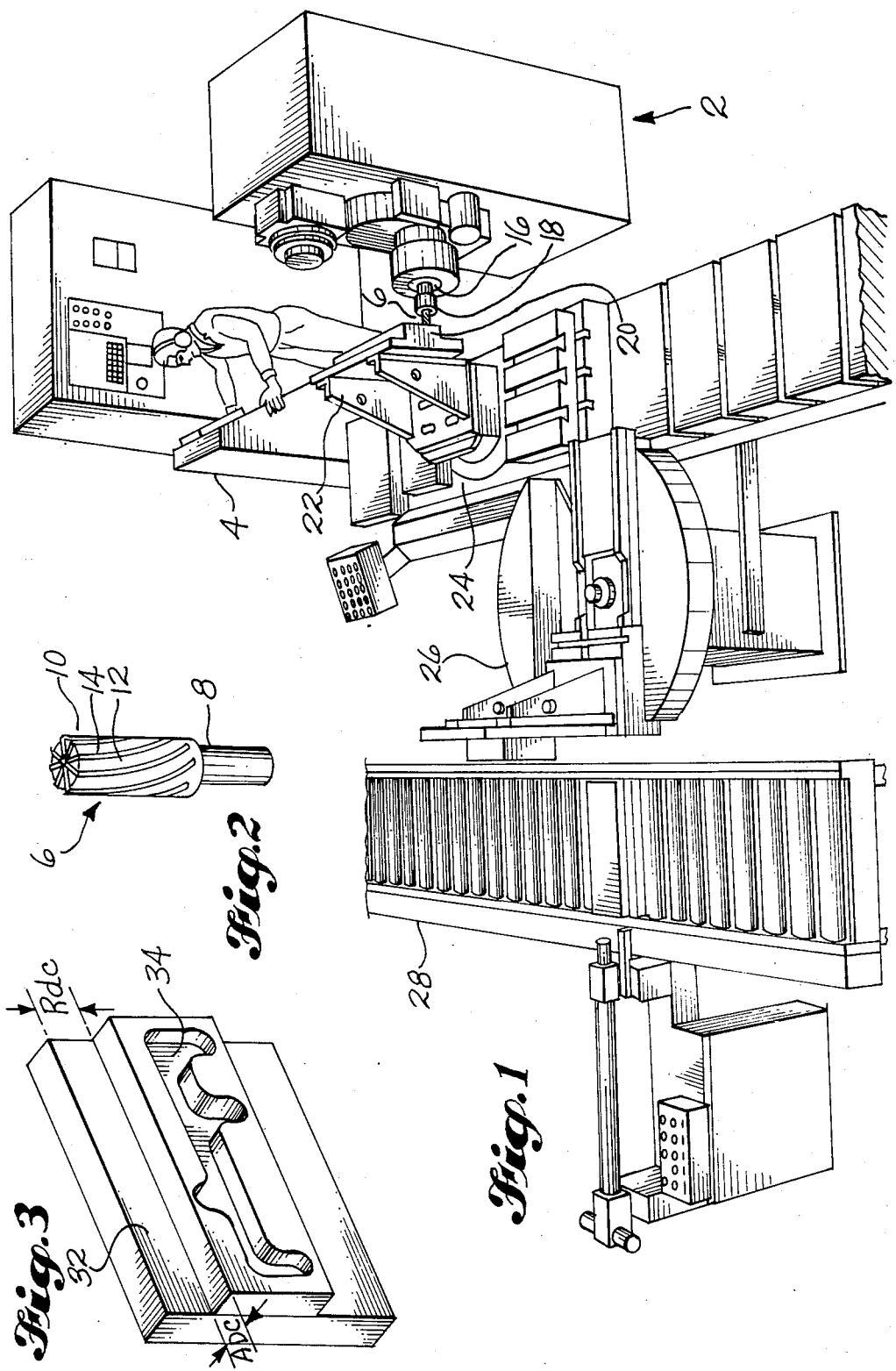

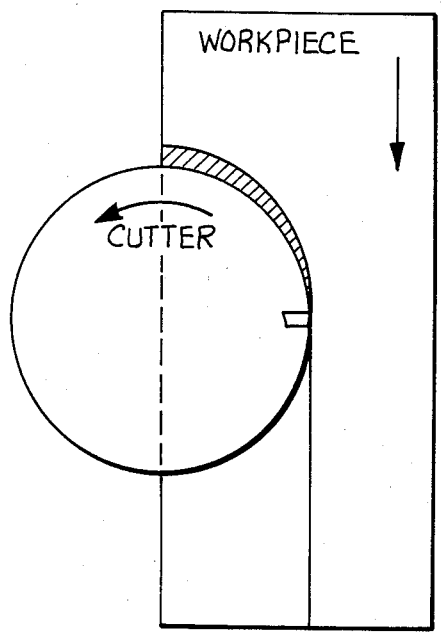
Fig. 4
| N | 1 | 2 | 3,4 | 5,6 | 7,9 | 10+ |
|---|---|---|-----|-----|-----|-----|
| Ee | 100 | 96 | 86 | 75 | 65 | 55 |
Fig. 11
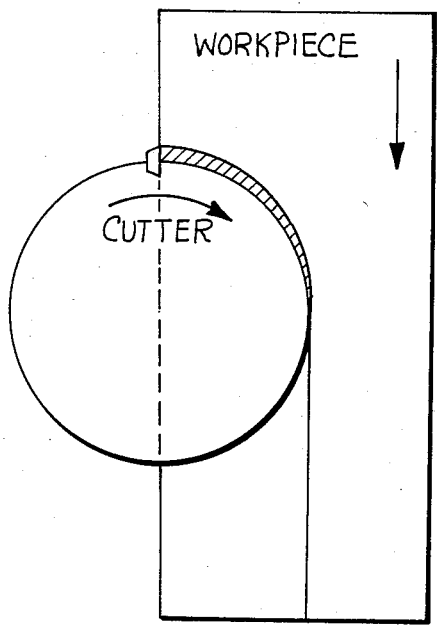
Fig. 5

INPUT DATA

| | | |
|---|---|---|
| Aaa | = | TYPE OF ALUMINUM |
| Adc | = | AXIAL DEPTH OF CUT |
| Cdir | = | CUT DIRECTION<br>1 = CLIMB  2 = CONVENTIONAL |
| Cutfl | = | COOLANT<br>1 = WATER SOLUBLE  2 = DRY |
| Cutmat | = | CUTTER MATERIAL<br>1 = H.S.S.  2 = COBALT  3 = CARBIDE |
| Cut-type | = | TYPE OF CUT<br>1 = SLOT  2 = SLAB  3 = FACE  4 = PERIPHERY |
| D | = | CUTTER DIAMETER |
| Ds | = | CUTTER SHANK DIAMETER |
| Fix | = | FIXTURE CONDITION<br>1-10 (RIGID) |
| Fl | = | CUTTER FLUTE LENGTH |
| Helex | = | CUTTER HELICAL ANGLE |
| Ksi | = | PART HARDNESS KSI |
| Mac | = | MACHINE TYPE |
| Macc | = | MACHINE CONDITION<br>1-10 (RIGID) |
| Mhp | = | MACHINE RATED HORSEPOWER |
| Mrpm | = | MACHINE MAX REVOLUTIONS PER MINUTE |
| Mt | = | PART MATERIAL<br>1 = ALUMINUM  2 = ALLOY STEEL  3 = TITANIUM<br>4 = STAINLESS |
| N | = | CUTTER NUMBER OF TEETH |
| Oal | = | CUTTER OVERALL LENGTH |
| Rad | = | NOSE RADIUS OF CUTTER TEETH |
| Rdc | = | RADIAL DEPTH OF CUT |
| Rk | = | CUTTER RAKE ANGLE |
| Spld | = | SPINDLE SIDE LOAD (MAX. FORCE) |
| Surf | = | SURFACE FINISH<br>1 = ROUGHING  2 = FINISHING |

| CUTTER MATERIAL CONSTANTS | | | | |
|---|---|---|---|---|
| Cutmat | Yield | Young | Confac | Tens |
| 1 HSS | 49000 | 30000000 | 5810 | 107000 |
| 2 COBALT | 44000 | 30500000 | 6810 | 100000 |
| 3 CARB. | 35000 | 40000000 | 2492 | 90000 |
| 4 CARB. INS. | 35000 | 40000000 | 2492 | 120000 |

Fig. 8

| PART MATERIAL CONSTANTS | | | | Cf | |
|---|---|---|---|---|---|
| Mt | Pf | M | | D<.7 | D>.7 |
| 1 ALUMINUM | .33 | 10 | | 12050 | 10050 |
| 2 ALLOY STEEL | .7 | .3 | | 18300 | 23300 |
| 3 TITANIUM | 1.1 | .25 | | 18750 | 24650 |
| 4 STAINLESS | 1.5 | .2 | | 20650 | 25650 |

NOTE: For SLOT cuts reduce Cf by 2550

| MATERIAL BEING MACHINED | "IDEAL" | | | | | |
|---|---|---|---|---|---|---|
| | FEED/TOOTH | | SURFACE FEET/MINUTE | | | |
| | | | ROUGHING | | FINISH | |
| | HSS | CARB | HSS | CARB | HSS | CARB |
| 4340 | | | | | | |
| 250 BHN | .0050 | .0060 | 70 | 325 | 100 | 430 |
| 275 BHN | .0048 | .0057 | 62 | 265 | 87 | 350 |
| 300 BHN | .0046 | .0054 | 55 | 205 | 77 | 275 |
| 325 BHN | .0044 | .0050 | 48 | 185 | 70 | 245 |
| 350 BHN | .0042 | .0048 | 48 | 160 | 64 | 215 |
| 375 BHN | .0035 | .0042 | 40 | 145 | 58 | 195 |
| 400 BHN | .0030 | .0036 | 40 | 130 | 53 | 175 |
| 425 BHN | .0025 | .0030 | 34 | 120 | 49 | 160 |
| 450 BHN | .0020 | .0024 | 34 | 110 | 45 | 145 |
| 475 BHN | .0015 | .0018 | 32 | 95 | 42 | 132 |
| 500 BHN | .0010 | .0012 | 30 | 90 | 40 | 120 |
| ALUMINUM | | | | | | |
| 7075-T6 | .0090 | .0090 | 1000 | 3000 | 2000 | 4800 |
| TITANIUM | | | | | | |
| 6AL-4V | .0055 | .0060 | 35 | 75 | 50 | 90 |
| STAINLESS | | | | | | |
| 17-4PH | .0030 | .0040 | 60 | 200 | 70 | 250 |
| 15-5PH | .0030 | .0040 | 60 | 200 | 100 | 275 |

*Fig. 9*

CALCULATION SYMBOL DEFINITIONS

| | | |
|---|---|---|
| Ad1 | = | Adc/D AXIAL DEPTH OF CUT DIVIDED BY DIAMTER |
| Ad2 | = | Adc/2 AXIAL DEPTH OF CUT DIVIDED BY 2 |
| Bhn | = | PART HARDNESS FROM KSI TO BRINELL |
| Cd | = | CUTTER DEFLECTION |
| Cf | = | FORCE FACTOR IN FORMULA |
| Cf1 | = | FACTOR FOR FORCE |
| Cond | = | MINIMUM VALUE FOR MACHINE/FIXTURE |
| Coshel | = | COS (HELEX TIMES .0175) |
| D2 | = | D/2 CUTTER DIAMETER DIVIDED BY 2 |
| Fcf | = | FORCE TO BREAK CUTTER AT FLUTE |
| Fcs | = | FORCE TO BREAK AT SHANK |
| Fct | = | FORCE TO BREAK CUTTER AT TEETH (IMPACT) |
| Fideal | = | "IDEAL" FEED RATE (CHIP LOAD) |
| Fl2 | = | FL/D FLUTE LENGTH DIVIDED BY DIAMETER |
| Fl3 | = | Adc/Fl AXIAL DEPTH OF CUT DIVIDED BY FLUTE LENGTH |
| Fm | = | MAX. UNDEFORMED CHIPLOAD (FEED PER TOOTH) |
| Fmax | = | MAX. ALLOWABLE CUTTER FORCE |
| Fpt1 | = | MAX. FEED PER TOOTH FOR SURFACE FINISH |
| Fpt2 | = | MAX. FEED PER TOOTH FOR MAX. AVAILABLE HORSEPOWER |
| Fpt3 | = | MAX. FEED PER TOOTH FOR MAX. FORCE AVAILABLE |
| H | = | HORSEPOWER AT CUT |
| Hpa | = | MACHINE HORSEPOWER AVAILABLE AT SPINDLE |
| Hstar | = | PART HARDNESS FACTOR |
| K | = | CUTMAT |
| Q | = | METAL REMOVAL RATE (CU.IN. PER MINUTE) |
| Rad-Comp | = | CUTTER RADIUS COMPENSATION |
| Rd2 | = | Rdc/D RADIAL DEPTH OF CUT DIVIDED BY DIAMETER |
| Rideal | = | "IDEAL" REVOLUTIONS PER MINUTE |
| Sideal | = | "IDEAL" SURFACE FEET PER MINUTE |
| Tens | = | CUTTER TENSILE STRENGTH |
| Tl | = | TOOL LIFE IN INCHES |
| Tq | = | TORQUE AT CUT |
| Yield | = | YIELD STRENGTH |
| Young | = | YOUNG'S MODULUS |

*Fig.10*

METHOD OF DETERMINING FEED RATE AND CUTTING SPEED FOR CUTTING METAL AND OF PREDICTING CUTTING EFFECTS

DESCRIPTION

1. Technical Field

This invention relates to methods for controlling metal cutting operations and, more particularly, to such a method that provides accurate estimates of optimal feed rates and cutting speeds and/or accurate predictions of the effects of a cutting operation, to make it possible to begin a part program with optimized feed rates and cutting speeds and to accurately estimate production costs and schedules before beginning machining operations.

2. BACKGROUND ART

During the past several decades, there have been numerous attempts to develop methods for accurately predicting the effects of metal cutting. The methods that have been proposed have resulted in inaccurate and unreliable predictions, largely because of the failure and/or inability to adequately account for inconsistencies in the cutting tool, the mounting fixture, the material to be cut, and the cutting machine. The lack of any known method for providing accurate predictions of the metal cutting effects has made it impossible to determine optimized part feed rates and cutter speeds before beginning a cutting operation. In addition, it has been extremely difficult to estimate with any degree of accuracy production costs and schedules for machining operations since such costs and schedules are highly dependent on the actual effects of the cutting operation. This has led to uncertainty in manufacturing operations that require machining metal parts and has prevented the kind of optimized efficiency of such manufacturing opeations that can be obtained from detailed planning and accurate cost projections.

The inability to accurately estimate the optimized feed rates and cutting speeds for machining operations makes it necessary for numerical control programmers to input unreliable estimates of the correct feed rates and cutting speeds into programs for machining metal parts. When the cutting machine is manually controlled, this results in a heavy burden on the machine operator to adjust the feed rates and cutter speeds to optimize the machining operation. The ability to make such adjustments is highly dependent on the individual operator and is at best much more of an art than a science.

When the cutting operation is part of an adaptive control system—that is, a system in which the cutting parameters are modified during the cutting operation based on feedback from sensors that sense the cutting effects in real time—the machining operation still requires, before the machining operation starts, maximum limits on horsepower, cutting force, feed rates, and cutting speeds. The effectiveness and efficiency of the adaptive control machining operation are decreased by inaccuracies in the preset maximum limits, and in order to be reasonably accurate, the maximum limits must be determined by a method that is capable of accurately predicting the effects of the metal cutting. Therefore, the effectiveness and efficiency of adaptive control systems, as well as manually controlled systems, have not been optimized in known systems because of the inability to accurately predict cutting effects.

A method and/or apparatus for controlling a milling or lathe machine is disclosed in each of the following U.S. Pats.: U.S. Pat. No. 3,548,172, granted Dec. 15, 1970, to R. M. Centner et al.; U.S. Pat. No. 3,557,350, granted Jan. 19, 1971, to T. Proctor; U.S. Pat. No. 3,576,976, granted May 4, 1971, to F. A. Russo et al.; U.S. Pat. No. 3,634,664, granted Jan. 11, 1972, to R. J. Valek; U.S. Pat. No. 3,665,493, granted May 23, 1972, to T. L. Glowzewski et al.; U.S. Pat. No. 3,715,938, granted Feb. 13, 1973, to A. Ledergerber et al.; U.S. Pat. No. 3,784,798, granted Jan. 8, 1974, to B. R. Beadle et al.; U.S. Pat. No. 3,812,474, granted May 21, 1974, to T. D. Linn et al.; U.S. Pat. No. 3,946,212, granted Mar. 23, 1976, to H. Nakao et al.; U.S. Pat. No. 3,947,667, granted Mar. 30, 1976, to P. R. Parker; U.S. Pat. No. 4,031,368, granted June 21, 1977, to B. Colding et al.; U.S. Pat. No. 4,208,718, granted June 17, 1980, to H. Chung; U.S. Pat. No. 4,328,448, granted May 4, 1982, to J. A. Berenberg et al.; U.S. Pat. No. 4,330,832, granted May 18, 1982, to Y. Kohzai et al.; U.S. Pat. No. 4,370,720, granted Jan. 25, 1983, to G. P. Hyatt; U.S. Pat. No. 4,393,449, granted July 12, 1983, K. Takeda et al.; U.S. Pat. No. 4,422,150, granted Dec. 20, 1983, to B. E. Keller et al.; and U.S. Pat. No. 4,445,182, granted Apr. 24, 1984, to E. Morita et al.

Centner et al. disclose an adaptive control system in which the machining operation is modified as a function of measured variables such as tool tip temperature and spindle torque. Centner et al recognize the difficulty of providing a method for predicting optimum speed and feed values, and state at column 2, lines 4-6: "The use of analytical techniques to predict optimum or near-optimum speed or feed values would be a formidable if not impossible task."

Beadle et al. use conventional equations to determine the speed and feed rate before the cutting operation. During the operation, a number of parameters are measured continuously, and the cutting operation is optimized from instant to instant on the basis of the measured parameters. The goal of Beadle et al. is to optimize the operation in an economic sense.

Colding et al. disclose an adaptive control system in which parameters relating to wear are measured, and the tool life is calculated from such parameters. The calculated tool life is then used in a formula to calculate productivity. In the productivity formula, the feed rate and cutting speed and varied until an optimized productivity is obtained. At col. 2, lines 10-13, Colding et al. state that: "From a general point of view, it can be said that all calculations to predict tool-life T give very uncertain results, if one does not check during the machining, that the conditions of the calculations are valid."

The above patents and the prior art that is discussed and/or cited therein should be studied for the purpose of putting the present invention into proper perspective relative to the prior art.

3. Disclosure of the Invention

A subject of the invention is a method of determining a feed rate and cutting speed for a machining operation before beginning the operation in a system having a machine with a cutter for cutting a metal workpiece and a fixture for mounting the workpiece. According to an aspect of the invention, the method comprises determining a first set of parameters, including a preliminary cutting speed and a preliminary feed rate, from the characteristics of the material to be cut, the cut to be made, the cutter, the fixture, and the machine. The maximum allowable cutter force and a base cutting speed are calculated from the first set of parameters. The maximum feed rate is calculated from the first set of parameters, the maximum allowable cutter force, and the base cutting speed. The calculated base cutting speed is designated as the cutting speed, and the calculated maximum feed rate is designated as the feed rate, for the machining operation. Preferably, after the maximum feed rate is calculated and before the cutting speed and feed rate for the machining operation are designated, the preliminary cutting speed and the preliminary feed rate are reset to equal the calculated base cutting speed and the calculated maximum feed rate, respectively. Then, the steps of calculating the maximum allowable cutter force, calculating the base cutting speed, and calculating the maximum feed rate are repeated. The repetition of these steps serves as an extra check on the accuracy of the results obtained. Experiments using the preferred embodiment of the invention, including this preferred repeat feature, have confirmed the accuracy of the first values obtained for the cutter force, cutting speed, and feed rate.

According to another aspect of the invention, the cutter is of the type having a shank and a cutting head that has flutes with cutting edge teeth. The step of calculating the maximum allowable cutter force comprises calculating the force required to break the cutter at its shank, the force required to break the cutter at its flutes, and the force required to fracture the teeth. The minimum of the three calculated forces and the maximum spindle load of the machine is taken to produce the maximum allowable cutter force.

Preferably, the step of calculating the maximum feed rate comprises calculating the maximum rate for the desired surface finish, the maximum rate for the maximum available horsepower, and the maximum rate for the maximum force available. The minimum of the calculated maximum rates is taken to arrive at the maximum feed rate.

A preferred feature of the invention is the calculating of a second set of parameters and, from the second set of parameters, determining how much time and what cutting tools the machining operation will require. The second set of parameters are calculated from the first set of parameters, the designated cutting speed, and the designated feed rate. The time and cutting tools the machining operation will require is determined from the second set of parameters, the designated cutting speed, and the designated feed rate. The determination of the time and tools required in turn enables a planner to estimate production costs and schedules. Preferably, the second set of parameters includes cutter deflection, actual cutting force, estimated cutter life, and estimated surface finish.

Another preferred feature of the invention is including in the step of determining the first set of parameters converting the hardness of the metal to be cut from force per unit area of Brinell hardness. This conversion to Brinell hardness facilitates a number of calculations included in the method of the invention. For example, the force required to fracture the teeth is preferably calculated from the converted hardness of the metal to be cut, characteristics of the cutter, and the preliminary feed rate. The maximum feed rate for the maximum force available is also preferably calculated from characteristics of the metal to be cut, including the converted hardness thereof, and characteristics of the cutter and the cut to be made. In the preferred embodiment, the cutter deflection, actual cutting force, estimated cutter life, and estimated surface finish included in the second set of parameters are also calculated using the converted hardness of the metal to be cut.

According to another aspect of the invention, the step of calculating the maximum allowable cutter force and the step of calculating the maximum feed rate each include correcting for the cutter condition, the fixture condition, and the machine condition. Inclusion in the method of the invention of these corrections solves the major problem encountered in the use of known methods of inadequately accounting for inconsistencies in the cutter, fixture, and machine. The corrections help make the predictions obtained by the method of the invention far more accurate than the predictions obtainable from any known methods. Thus, reliable cost estimates and realistic production schedules may be derived from the cutting effects predicted by the method of the invention.

The step of calculating the maximum feed rate for the maximum available horsepower preferably includes converting the machine rated horsepower into spindle horsepower. This conversion facilitates and increases the accuracy of the calculation of the maximum feed rate. In addition, it eliminates any need for taking measurements in real time during the actual machining operation in order to determine spindle horsepower. Thus, the conversion also facilitates the development of accurate predictions of cutting effects before the machining operation has commenced.

Another subject of the invention is a method of predicting cutting effects in a system having a machine with a cutter for cutting a metal workpiece and a fixture for mounting the workpiece. The basic steps of the method are selecting a fixed cutting speed and a fixed feed rate, determining a set of parameters, and calculating cutting effects. The parameters are determined from the characteristics of the metal to be cut, the cut to be made, the cutter, and the machine. The cutting effects are calculated from the fixed cutting speed and feed rate and the set of parameters. Preferably, the calculated cutting effects include the forces required to break the cutter, cutter deflection, actual cutting force, estimated cutter life, and estimated surface finish. Also preferably, the determination of the parameters includes converting the hardness of the metal to be cut from force per unit area to Brinell hardness.

The method of the invention provides accurate predictions of metal cutting effects and optimized feed rates and cutter speeds before a cutting operation is begun. These accurate predictions make it possible to reliably estimate production costs and schedules for machining operations and, in turn, substantially increase the overall efficiency of manufacturing operations requiring the cutting of metal parts. The method enables numerical control programmers to input accurate estimates of optimal feed rates and cutting speeds in programs for machining metal parts. Such accurate input greatly reduces the burden on the machine operator in a manually controlled cutting operation since there is a greatly reduced, if any, need for the operator to adjust the feed rates and cutter speeds during the cutting operation. The recommended feed rates and cutting speeds and the predicted cutting effects provided by the method of the invention also make it possible to increase the effectiveness and efficiency of adaptive control machining operations. By providing accurate starting feed rates and cutting speeds and accurate preset maximum limits, the method of the invention allows such operations to be optimized and the feedback generated in such operations to be used with maximum effectiveness.

These and other advantages and features will become apparent from the detailed description of the best most for carrying out the invention that follows.

BRIEF DESCRIPTION OF THE DRAWINGS

In the drawings, like element designations refer to like parts throughout, and:

FIG. 1 is pictorial view of a cutting machine and related apparatus of a type suitable for practicing the preferred embodiment of the method of the invention.

FIG. 2 is a pictorial view of a type of cutter that may be incorporated into the apparatus shown in FIG. 1.

FIG. 3 is a pictorial view of a machined metal part, illustrating a periphery cut and a profile cut.

FIG. 4 is a schematic view of a cutter and workpiece illustrating the conventional cut direction.

FIG. 5 is like FIG. 4 except that it illustrates the climb cutting direction.

FIG. 6 is a table listing the first set of parameters and the abbreviations therefor.

FIG. 7 is a table of cutter material constants.

FIG. 8 is a table of part material constants.

FIG. 9 is a table of preliminary values for cutter speed and feed rate.

FIG. 10 is a table of symbols used in the calculations of the preferred embodiment of the method.

FIG. 11 is a table of a cutter rigidity factor relating to the number of cutter teeth.

BEST MODE FOR CARRYING OUT THE INVENTION

The following is a detailed description of the best mode of the invention currently known to the applicant. FIGS. 1 and 2 show typical apparatus for practicing the preferred embodiment of the invention. It is anticipated that a primary application of the method of the invention will be in installations such as that shown in FIG. 1. However, it is of course to be understood that the method of the invention may also be practiced to great advantage in other types of metal cutting installations.

The method of the invention may be used to advantage in connection with making a variety of different types of cuts. The types of cuts specifically provided for in the preferred embodiment are a slot cut (cut same width as cutter), a face cut (reduced thickness of entire workpiece by removing material from one entire face), a slab cut (like a face cut using two cutters and removing material from two opposite faces), and a periphery cut (reduce thickness around all or part of periphery). A slab cut would require a type of machine different from the type shown in FIG. 1. FIG. 3 illustrates a periphery cut 32 and a profile cut 34. The latter is a combination of a slot cut and a periphery cut. FIGS. 4 and 5 illustrate the cut directions, conventional and climb, respectively, specifically provided for in the preferred embodiment. It is of course to be understood that the method of the invention may also encompass additional cut types and cutting directions without departing from the spirit and scope of the invention. For example, a contour cut made with a ball nosed cutter could be treated like a periphery cut.

The installation shown in FIG. 1 includes a four-axis cutting machine 2 that is controlled by an operator via a control console 4. The machine 2 has a cutting tool or cutter 6 mounted rotatably thereon by means of a spindle 16 and tool holder 18. The tool 6 is shown being used to machine cuts on a part 20. The part 20 is mounted on a fixture 22. The position of the fixture 22, and thereby the position of the part 20, relative to the tool 6 is controlled by feed apparatus 24 that moves the fixture 22 in accordance with a numeric control computer program and the input of the operator. A turntable 26 delivers fixtures 22 and parts to be machined mounted thereon from a conveyor 28 to the feed apparatus 24 and returns machined parts from feed apparatus 24 to conveyor 28.

The cutter shown in FIG. 2 includes a shank 8 and a cutting heat 10. The cutting head 10 has a number of helical flutes 12 spaced around a circumferential surface. Each flute 12 has a cutting edge 14. The cutting edges 14 form the teeth 14 of the cutter 6.

In the method of the invention, a computer program is used to accurately estimate the correct feed rate and cutting speed for a machining operation before the operation is begun. The method is used in connection with a cutting installation, such as the installation shown in FIG. 1, for cutting metal workpieces. Preferably, the method also includes determining how much time and what cutting tools the machining operation will require. This in turn enables a planner to accurately estimate production costs and schedules.

The method of the invention includes determining a first set of parameters from the characteristics of the material to be cut, the cut to be made, the cutter, the fixture, and the machine. The table shown in FIG. 6 lists the preferred embodiment of the first set of parameters and the abbreviations associated therewith. The parameters relating to the characteristics of the cutter include the dimensions of the cutter, the material from which the cutter is made, a number of constants relating to such material, and the number of teeth which the cutter has. The cutter material designations are high strength steel, cobalt, and carbide. The dimensions of the cutter, the cutter material, and the number of teeth are input into a computer when it is desired to determine the feed rate and cutting speed for a particular machining operation and/or predict the effects of such operation. The constants relating to the cutter material are preferably loaded into the memory of the computer for retrieval when a particular job is to be run and data, such as cutter dimensions, relating to such job is input. FIG. 7 is a table of the cutter material constants that are stored in the computer. These constants include the yield strength of the material, Young's modulus, the tensile strength of the cutter, and Confac, a constant developed experimentally by the applicant. The rigidity of the cutter is taken into account in the formulas of the preferred embodiment by use of these constants.

The parameters relating to the characteristics of the cut to be made include the dimensions of the cut, the type of cut, the direction of the cut, and the surface finish desired. Each of these parameters is input into the computer along with the input relating to the cutter. As discussed above, in the preferred embodiment of the invention, the type of cut is classified into four catagories, slot cuts, slab cuts, face cuts, and peripheral cuts (PERF.); and the cut direction may be either conventional or climb. The surface finish desired is either a finished surface or a rough surface.

The fixture condition is included in the first set of parameters. The fixture condition is a number from one to ten that reflects the relative rigidity of the fixture. A fixture with a condition of ten is in top condition and has maximized rigidity. A lower fixture condition number indicates a correspondingly lower degree of rigidity.

The parameters relating to the characteristics of the machine include the machine type, the machine horsepower rating, maximum spindle side load, maximum revolutions per minute, the type of coolant used with the machine, and the machine condition. The machine condition is a number from one to ten indicating relative rigidity in the same manner as the fixture condition parameter. The type of coolant is either water soluble or dry. Each of the parameters relating to the machine is input into the computer along with the parameters relating to the cutter and the cut characteristics.

The parameters relating to the part material include a designation of the material and several constants relating to such material. The part material is either aluminum, alloy steel, titanium, or stainless steel. When the part material is alloy steel, the material classification is further subdivided in accordance with the relative hardness of the alloy. FIG. 8 is a table of three of the part material constants used in carrying out the method of the invention. These constants are Pf, a standard power or machinability factor, and M and Cf, two constants derived experimentally by the applicant. The table in FIG. 9 shows the hardness subdivisions used in connection with alloy steel.

The data relating to the part material that is input into the computer as part of the first set of parameters includes the part material hardness expressed in force per unit area, more specifically, kips per square inch (KSI). In order to facilitate a number of the calculations included in the method of the invention, the determining of the first set of parameters includes the conversion of the part material hardness from force per unit area to Brinell hardness. The formula for accomplishing such conversion is one of the novel aspects of the method of the invention. The formula is:

$$Bhn = 1.929(Ksi) + 12.714$$

The converted part hardness is used to determine an additional hardness factor relating to the part material in accordance with the following formula:

$$Hstar = 0.0044 (Bhn) + 0.1$$

The calculated Brinell hardness Bhn and the hardness factor Hstar are used in calculations of the force required to fracture the cutter teeth, the maximum feed rate for the maximum force available, cutter deflection, actual cutting force, estimated cutter or tool life, and estimated surface finish. The calculation of these forces and cutting effects are described in greater detail below.

In addition to the inputting of data, reading of stored data, and performing of calculations described above, the determination of the first set of parameters also includes additional calculations to adjust the material constants for factors such as cut type and the cutter diameter. These calculations are included in the computer program that forms an appendix to this application and are also reflected in the table shown in FIG. 8.

The first set of parameters also includes a preliminary or "ideal" cutting speed and a preliminary or "ideal" feed rate. In the method of the invention, the preliminary cutting speed and feed rate are predetermined from experience rather than using known formulas which give only rough approximations of the correct cutting speed and feed rate. The predetermined "ideal" feed rates, expressed in feed per tooth or chip load, and cutter speeds, expressed in surface feet per minute, are set forth in the table shown in FIG. 9. As can be seen in FIG. 9, the predetermined values take into account the cutter material, the surface finish desired, and the part material.

The method of the invention also includes calculating, from the first set of parameters, the maximum allowable cutter force. Preferably, the calculation of such maximum allowable force includes calculating the force required to break the cutter at its shank, the force required to break the cutter at its flutes, and the force required to fracture or chip the cutter teeth. The minimum of these three calculated forces and the maximum spindle load of the machine is taken to arrive at the maximum allowable cutter force. The formulas used in the preferred embodiment of the invention for determining the three calculated forces are set forth below. Intermediate parameters, such as Ad2, and other calculation symbols used in these formulas and other formulas of the invention are listed in the table shown in FIG. 10.

Force Required to Break the Cutter at its Shank $$Fcs = \frac{1.3(Yield)(Ds)^2}{\frac{Oal - Ad2}{DS} + \sqrt{\left(\frac{Oal - Ad2}{Ds}\right)^2 + .3(Rd2)^2 + \left(.3\left(\frac{D}{Ds}\right) + .332\right)^2}}$$

Force Required to Break the Cutter at its Flutes
$$Kk = .0225 - .0016(N) + .00036(N)^2$$

$$Fcf = \frac{Kk(D)^2(10)^6}{\frac{Fl - Ad2}{D} + \sqrt{\left(\frac{Fl - Ad2}{D}\right)^2 + (.3(Rd2))^2 + 12.9Kk)^2}}$$

Impact Force Required to Fracture Cutter Teeth $$Fct = Tens\left(\frac{(Fideal)^{.139}(D)^{.548}(Adc)^{.89}(N)^{.7}}{(Bhn)^{.521}}\right)$$

The first set of parameters is also used to calculate a base cutting speed. The three primary formulas used in calculating such base cutting speed are as follows:

Aluminum — Slot Cut ($Rdc = D$)

$$Rpm = 3120(Fl2)^{.7857(Fl3)} - .4351$$

Aluminum - All Other Cuts ($Rdc = < D$)

-continued $$Rpm = 2550(2 - Rd2)(Fl2)^{.7857(Fl3) - .4351}$$

All other materials $$Sfm = Sideal(.9618 + .0608(Fl2) - .0236(Fl3)^2)$$

The determination of the base cutting speed also includes the use of the standard formulas for converting revolutions per minute (Rpm) to surface feet per minute (Sfm), as follows:

$$Rpm = \frac{12(Sfm)}{\pi D} \ ; \ Sfm = \pi D \frac{Rpm}{12}$$

Following the calculation of the maximum allowable cutter force and the base cutting speed, the method includes calculating the maximum feed rate from the first set of parameters, the maximum allowable cutter force, and the base cutting speed. Preferably, calculating the maximum feed rate includes calculating the maximum rates for the desired surface finish, the maximum available horsepower, and the maximum force available. The minimum of the three calculated rates is taken to arrive at the maximum feed rate.

The method of the invention preferably includes correcting both the maximum allowable cutter force and the maximum feed rate for the fixture condition and for the machine condition. The minimum of the fixture condition number and the machine condition number is taken and then is used to calculate two correcting factors, Fix1 and Fix2. The first correcting factor is then used to adjust the calculated maximum allowable cutter force (Fmax) and the machine rated horsepower (Mhp). The formulas for performing such calculations are as follows:

$$Cond = \text{MINIMUM OF FIXTURE AND PART}$$

$$Fix\ 1 = 1 - (Cond * .1)$$

$$Fix\ 2 = 3.5 - (Cond * .1)$$

IF Fix 1 = 0 THEN Fmax = Fmax

AND Mhp = Mhp

OTHERWISE Fmax = Fmax - Fmax(Fix 1)

AND Mhp = Mhp - Mhp(Fix 1)

The second correcting factor is Fix2 used in the calculation of the maximum feed rate for the desired surface finish (Fpt1). The formulas for calculating Fpt1 are as follows:

IF Surf = 1 (ROUGHING) THEN Temp = $100/[3.18(10)^5]$
IF Surf = 2 (FINISH) THEN Temp = $63/[3.18(10)^5]$ $$Ff1 = \sqrt{6.4846(N)^2(Temp)^2 + 32(D/2)(Temp)}$$

IF Cdir = 1 (CLIMB CUT):
Fpp1 = [.5(Ff1) - 4(Temp)(N)]/Pl
OTHERWISE:
Fpp1 = [4(Temp)(N)]/[(Pl + .5(Ff1)]
Fpt1 = ABS(Fpp1/Fix2)

The above formulas for calculating the maximum rate for the desired surface finish are another novel feature of the invention and further add to the accuracy of the recommended cutting speed and feed rate and the predicted cutting effects. By taking more factors into account and by more accurately reflecting the actual effects of such factors, these formulas contribute to the greatly improved results achieved by the method of the invention over previously known methods.

Another novel feature of the invention is the conversion of the machine rated horsepower into spindle horsepower. The spindle horsepower is in turn used in the calculation of the maximum feed rate for the maximum available horsepower. The formula for converting machine horsepower to spindle horsepower is as follows:

$$Hpa = Mhp - (0.106\ Mhp + 1.772)$$

The formulas used in calculating the maximum feed rate for the maximum available horsepower are based on known formulas that have been modified by the applicant. The formulas are as follows:

$Cr = Rk(-.0165) + .95$
IF $Sfm > 800$ THEN $Cs = .64$ OTHERWISE
$Cs = Sfm(-.00066) + 1.1$
IF $D < .65$ THEN $Mf = Pf*2$ OTHERWISE $MF = Pf$
IF Cut__ type = Slab, THEN $Dr = Adc/D$ OTHERWISE
$Dr = Rdc/D$
IF $Rdc \geq D/2$ THEN $Bb1 = $ Coshel OTHERWISE $$Bb1 = 2(Coshel)[\sqrt{(Dr(1 - Dr)}\ ]$$

$Bb2 = Rdc(Adc)(Rpm)(N)$
$Bb3 = 0.819(Pf)(Cs)(Cr)(Bb1)$ $$Fpt2 = \left( \frac{Hpa(Bb1)^{.125}}{Bb3} \right)^{1.143}$$

The formulas for calculating the maximum feed rate for the maximum force available are as follows:

$Ad6 = Adc/(.1785\ Coshel)$
$Fpt3 = $ $$\left( \frac{Fmax(Rk)^{.65}(.6)}{Cf(Ad6)^{.59}(Rd2)^{(1.37/N)}(Rd2)^{.263}(N)^{.283}(Hstar)^{.488}(D)^{.231}(Sfm)^{.1}} \right)^2$$

The calculation of the maximum feed rate produces a feed rate expressed in feed per tooth (Ft) or chip load. The calculations performed in carrying out the preferred embodiment of the invention also include using a standard formula to convert the feed per tooth into feed in inches per minute as follows:

$$F = Ft\ (N)(Rpm)\ .$$

In the preferred embodiment, following the initial calculation of the maximum allowable cutter force, the base cutting speed, and the maximum feed rate, the preliminary or ideal cutting speed and feed rate that form a part of the first set of parameters are reset to equal the calculated base cutting speed and the calculated maximum feed rate, respectively. Then, the steps of calculating the maximum allowable cutter force, calculating the base cutting speed, and calculating the maximum feed rate are repeated. Following the recalculations, the recalculated base cutting speed is designated as the recommended cutting speed for the machining operation, and the recalculated maximum feed rate is designated as the recommended feed rate for the machining operation.

The method of the invention preferably further comprises calculating a second set of parameters which provide predictions of cutting effects. The second set of parameters are calculated from the first set of parameters, the designated cutting speed, and the designated feed rate. The second set of parameters, along with the designated cutting speed and designated feed rate, are used by cost estimators and shop load planners to determine how much time and what cutting tools the machining operation will require. This enables the estimators and planners to accurately estimate production costs and schedules.

The calculation of the second set of parameters preferably includes calculating cutting horsepower, cutting torque, metal removal rate, maximum undeformed chip load, cutter deflection, actual cutting force, estimated tool life, and estimated surface finish. The metal removal rate Q is calculated from a standard industry formula as follows:

$$Q = Rdc(Adc)(F)$$

The maximum undeformed chip load Fm and the cutting horsepower, or the horsepower at the cut required for the recommended feed rate and cutting speed, H are calculated using known formulas modified by the applicant. The formulas for calculating the maximum undeformed chip load are as follows:

Slab cut $Dr = Adc/D$, OTHERWISE $Dr = Rdc/D$
If $Rdc \geq D2$, $Fm = Ft$ (Coshel)
OTHERWISE $$Fm = 2(Ft)(\sqrt{Dr(1 - Dr)})(\text{Coshel})$$

The formulas for calculating the cutting horsepower H are as follows:

$$Ct = .565(Fm)^{-.124}$$

$$Cr = Rk(-.0165) + .95$$

IF $Sfm > 800$ THEN $Cs = .64$ OTHERWISE $Cs =$ $$Sfm(-.00066) + 1.1$$

$$H = Q(Pf)(Cs)(Ct)(Cr)1.25$$

The cutting torque required Tq is calculated using a standard industry formula as follows:

$$Tq = \frac{63025(H)}{Rpm}$$

The actual cutting force is determined by use of the following formulas:

$$Ad6 = Adc/(\text{Coshel}(.1785))$$

$$Fv = \frac{Cf(Ad6)^{.59}(Rd2)^{(1.37/N)}(Rd2)^{.263}(N)^{.283}(Hstar)^{.485}(Ft)^{.439}(D)^{.231}(Sfm)^{.07}}{(Rk)^{.65}}$$

The determination of the surface finish expected is another novel aspect of the invention. It includes a preliminary determination of a cutter rigidity factor Rc. Such factor is determined on the basis of the following formulas:

$$Rc1 = Fl - Adc/5$$

$$Rc = \frac{8(Rc1)^3 + 18(Adc)(Rc1)^2 + 12(Rc1)(Adc)^2 + 3(Adc)^3}{24}$$

This factor Rc is then used to calculate the generated or expected surface finish Suff in accordance with the following formulas:

$$\text{Climb cut: } Suf = \frac{Rc(Rd2)(Ft)^2(Bhn)^{.52}}{4(D2) - Ft(N/\pi)}$$

$$\text{Conventional cut: } Suf = \frac{Rc(Rd2)(Ft)^2(Bhn)^{.72}}{4(D2) + Ft(N/\pi)}$$

$$Suff = Suf(3.18)(10)^5$$

The determination of the cutter deflection Cd includes a preliminary determination of a cutter rigidity factor Ee from the number of cutter teeth in accordance with the tables shown in FIG. 11. The factor Ee is then used in the following formula to calculate the cutter deflection Cd.

$$Cd = \frac{Fv(Rc)(Ee)}{\text{Young}(D)^4}$$

IF $D \leq .7$ $Cd = Cd(.6)$ OTHERWISE $Cd = Cd$

The estmated tool life or cutter life in inches T1 is calculated as follows:
Climb cut: P=1
Conventional cut: P=0.28
Water soluable coolant: C=1
Dry coolant: C=0.8
Allowable wear land constant: W=0.01.

IF $Cutmat = 1$ OR 2 (HSS OR COBALT) THEN USE $$Tl = \frac{(Confac - Fv)(W)(M)(C)(P)(10)^7(D)^2}{(Sfm)^{1.9}(Fl2)^{.83}(Ft)^{.62}(N)^{.16}(Bhn)^{1.2}(Rd2)^{.56}}$$

IF $Cutmat = 3$ OR 4 (CARBIDE) THEN USE $$Tl = \frac{(Confac - Fv)(W)(M)(C)(P)(10)^7(D)^2}{(Sfm)^{1.8}(Fl2)^{.83}(Ft)^{.62}(N)^{.16}(Bhn)^{1.1}(Rd2)^{.2}}$$

In the calculations performed in accordance with the preferred embodiment of the method of the invention, a number of correcting factors are provided to adjust calculated values to more realistic levels. For example, if the calculated cutter deflection is greater than 0.05 or the calculated feed in inches per minute is greater than 100, the feed per tooth is adjusted by reducing it in increments of 0.0005 inches until the cutter deflection or feed in inches per minute is below 0.05 or 100, respectively. If the feed per tooth reaches a level of less than 0.001, then the calculations being performed in the method are interrupted and a suggestion is made to the person running the program that the cut parameters be changed.

The output provided by the method of the invention may be used by a programmer in an adaptive control system to improve the efficiency and accuracy of the system. The recommended cutter speed and feed rate provided by the method give the programmer optimized values to input as the initial speed and feed of the cutting operation. The predicted effects provided by the method enable the programmer to input accurate maximum limits on horsepower, torque, cutting force, and speed and feed rates. The improved accuracy of the maximum limits derived by means of the method of the invention significantly increases the effectiveness of the adaptive control system.

As described above, the method of the invention is used to obtain recommended cutter speeds and feed rates for machining operations. The formulas and computer program included in the preferred embodiment of the method of the invention may also be used to predict cutting effects based on fixed cutting speeds and feed rates. The procedure for accomplishing this includes selecting a fixed cutting speed and a fixed feed rate, determining the first set of parameters and calculating the forces required to break the cutter, as described above. The steps of calculating the base cutting speed and the maximum feed rate are not included since the cutting speed and feed rate are fixed. The second set of parameters are calculated as described above. These calculations result in output including the forces required to break the cutter and the eight cutting effects discussed above: cutting horsepower, cutting torque, metal removal rate, maximum undeformed chip load, cutter deflection, actual cutting force, estimated tool life, and estimated surface finish.

The method of the invention has been discussed and described herein in connection with a milling machine. It is intended to be understood that the method of the invention could also be applied to advantage in a lathe-type machine. The modifications of the preferred embodiment that would be required to adapt it to a lathe-type machine would include the adjustment of the constants used in the equations of the method.

The method of the invention provides very accurate estimates of the correct cutter speed and feed rate for a machining operation and also very accurate predictions of the cutting effects. The method of the invention provides a very comprehensive algorithm that includes many details not accounted for in previously known methods and that results in the accurate predictions and recommendations. A number of the critical formulas and constants used in the method of the invention were statistically developed from test data to add further assurance to the accuracy of the predictions and recommendations obtained by use of the method. The achievement of the method of the invention is to provide substantially optimized cutting speeds and feed rates for machining operations and accurate predictions for use in planning and cost estimating.

Experiments using the method of the invention to determine correct feed rate and cutting speed and to predict cutting effects in installations using standard end mills have indicated that the overall accuracy of the method of the invention is better than 90 percent. It is expected that, by use of the method of the invention and the accurate predictions and recommendations it provides, a savings of 25 percent can be achieved in the total cost of machining operations.

It should be obvious to those skilled in the art to which this invention is addressed that the invention may be used to advantage in a variety of situations and that various modifications, changes, and omissions in form and detail may be made without departing from the spirit and scope of the invention as defined by the following claims.

APPENDIX

Computer Program and Sample Run for
U.S. Patent Application of

David A. Anderson

Entitled:

"METHOD OF DETERMINING FEED RATE AND CUTTING SPEED
FOR CUTTING METAL AND OF PREDICTING CUTTING EFFECTS"

Program Language: Basic 3.0
Computer Type: Hewett Packard HP236

```
************ INPUT DATA ************
DATA FILE NAME IS 1X2S

CUTTING TOOL SPECIFICATIONS

TOOL MATERIAL IS HSS     TOOL DIM. ARE  1.000 X  2.000 X  4.500 X  1.000 X  .030
NUMBER OF TEETH =  4     HELEX ANGLE IS  = 30        RAKE ANGLE IS   = 10

CUT PARAMETERS
CUT DIRECTION IS CLIMB      COOLANT IS H2O SOL     CUT TYPE IS PERF
AXIAL DEPTH IS   1.000      RADIAL DEPTH IS   .500    CUT COND. IS ROUGHING

MATERIAL                           FIXTURE
MATERIAL IS ALLOY STEEL   HARDNESS IS 150 KSI    COND. IS 10

MACHINE
TYPE IS FMS                MAX. RPM IS  5000       MAX. HP. IS   30
MAX. SPINDLE LOAD IS  3000 Lbs.        MACHINE COND. IS 10
```

********** OUTPUT DATA ***********

```
***********************************************************************
***                    RECOMMENDED SPEED AND FEED IS:                ***
*** RPM IS   244    SFM IS   64    F/T IS  .0042    IPM IS   4.13   ***
***********************************************************************

FORCE TO BREAK TOOL AT SHANK IS     7904 Lbs.
   FORCE TO BREAK TOOL AT FLUTE IS     7186 Lbs.
   FORCE TO BREAK TOOL AT TEETH IS     6756 Lbs.

CUTTING HORSEPOWER IS           1.7
   CUTTING TORQUE IS             438.8      In. Lbs.
   METAL REMOVAL RATE IS           2.0628 Cubic In./Min.
   MAX. UNDEFORMED CHIP IS         .0037   Inches
   TOOL DEFLECTION IS              .0343   Inches
   ACTUAL CUTTING FORCE IS      2217.8      Lbs
   ESTIMATED TOOL LIFE IS         83         inches
   ESTIMATED SURFACE FINISH      150         microinches
```

```
10     ! RE-STORE "PATALG"
20     PRINT TAB(20),"*****************************************"
30     PRINT TAB(20),"********* MACHINABILITY ALGORITHM *********"
40     PRINT TAB(20),"*****************************************"
50     PRINT
60     ! WRITTEN BY David A. Anderson   MR&D MACHINING TECHNOLOGY A-2035
70     ! LAST REVISION 6/10/85
80     ! ******************** line labels ****************************
90     ! Menu=program menu,Enter=enter input data,Calc=calculation of data
100    ! Pri_out=print out input data,Pri_out_n=print out calculated data
110    ! FORMULAS:Fcs_f=force to break cutter at shank
120    !          Fcf_f=force to break cutter at flutes
130    !          Fct_f=force to chip cutter teeth
140    !          Rpma_f=RPM formulas alum. $ steel
150    !           Fts_f=calculate F/T for surface finish required
160    !          Fpcomp=fixture/part/machine compensation
170    !          Fthp_f=calculate F/T for horsepower available
180    !           Ftf_f=calculate F/T for force available
190    !           Chp_f=calculate cutting horsepower for F/T
200    !          Crig_f=calculate cutter rigidity
210    !            Cf_f=calculate cut force for F/T
220    !          Cdef_f=calculate cutter deflection for F/T
230    !           Ctl_f=calculate tool life for F/T
240    !          Csur_f=calculate surface finish generated
250    !
260    PRINT
270    !
280    ! THE INFORMATION CONTAINED HEREIN IS PROPRIETARY TO THE BOEING
290    ! COMPANY AND SHALL NOT BE REPRODUCED OR DISCLOSED IN WHOLE OR IN
300    ! PART OR USED FOR ANY PURPOSE WITHOUT WRITTEN AUTHORIZATION
310    ! FROM THE BOEING COMPANY.
320    !
330    ! THIS IS THE "MENU" PORTION OF THE PROGRAM 9/5/83,1/26/84,3/29/84,4/18/84,
5/17/84,9/16/84,12/15/84,2/4/85,5/2/85,6/14/85
340    !
350 Menu:  !
360    PRINTER IS 1
370    OPTION BASE 1
380    ON ERROR GOTO Err_r
390    DIM Temp_$(1)[18]
400    DIM Mac_$(1)[18]
410    Flag=0
420    !
430    PRINT "WHAT DO YOU WANT TO DO (ENTER 1,2,3,4,5,6 or 7)?"
440    PRINT
450    PRINT "              1.) SEARCH FOR IPM & RPM WITH NEW DATA"
460    PRINT "              2.) SEARCH FOR IPM & RPM WITH OLD DATA"
470    PRINT "              3.) RUN CALCULATIONS WITH NEW DATA"
480    PRINT "              4.) RUN CALCULATIONS WITH OLD DATA"
490    PRINT "              5.) LIST DATA FILES"
500    PRINT "              6.) DELETE DATA FILE"
510    PRINT "              7.) END PROGRAM"
520    PRINT
```

```
530    INPUT Oper
540    IF (Oper<1) OR (Oper>7) THEN R_8
550    SELECT Oper
560    CASE =1
570      Flag=0
580      GOSUB S_new
590    CASE =2
600      Flag=0
610      GOSUB S_old
620    CASE =3
630      Flag=1
640      GOSUB S_new
650    CASE =4
660      Flag=1
670      GOSUB S_old
680    CASE =5
690      GOSUB Lis_t
700    CASE =6
710      GOSUB Del_t
720    CASE =7
730      GOSUB En_d
740    END SELECT
750    !
760    STOP
770    !
780 S_new:   !                ***** NEW DATA *****
790    !
800    GOSUB Enter                          ! GOTO ENTER NEW DATA
810 R_1:  !
820    GOSUB Calc                           ! GOTO CALC NEW DATA
830    GOSUB Pri_out                        ! GOTO PRINT INPUT DATA
840    GOSUB Pri_out_n                      ! GOTO PRINT OUTPUT DATA
850    GOSUB Hard                           ! GOTO HARD COPY
860    GOSUB St_data                        ! GOTO STORE NEW DATA
870    INPUT "DO YOU WANT TO RE-RUN OR CHANGE THIS DATA FILE (Y/N)?",A$
880    A$=LWC$(A$)
890    IF (A$="y") THEN S_new
900    !
910    GOTO Menu                            ! RETURN TO MENU
920    RETURN
930    !
940 S_old:   !                ***** OLD DATA *****
950    !
960    GOSUB Lister                         ! GOTO LIST 'CAT'
970    GOSUB Pri_out                        ! GOTO PR-OUT
980    INPUT "IS THIS THE RIGHT DATA FILE (Y/N)?",A1$
990    A1$=LWC$(A1$)
1000   IF (A1$="n") THEN S_old
1010   !
1020   INPUT "DO YOU WISH TO CHANGE THIS DATA FILE (Y/N)?",B1$
1030   B1$=LWC$(B1$)
1040   IF (B1$="n") THEN R_3
1050   !
1060   PRINT "AS EACH QUESTION COMES UP, IF A CHANGE IS DESIRED THEN ENTER THE CHANGE"
1070   PRINT TAB(15);" PRESS ";CHR$(129);" CONT ";CHR$(128);" TO GO ON."
1080   PRINT
1090   PAUSE
1100 R_2: !
1110   GOSUB Enter                          ! GOTO ENTER
1120 R_3: !
1130   GOSUB Calc                           ! GOTO CALC
1140   GOSUB Pri_out                        ! GOTO PRINT INPUT DATA
1150   GOSUB Pri_out_n                      ! GOTO PRINT OUTPUT DATA
1160   GOSUB Hard                           ! GOTO HARD COPY
1170   GOSUB Res_tore                       ! GOTO RESTORE DATA
1180   !
1190   INPUT "DO YOU WANT TO RE-RUN OR CHANGE THIS DATA FILE (Y/N)?",A$
1200   A$=LWC$(A$)
1210   IF (A$="y") THEN R_2
1220   !
1230   GOTO Menu                            ! RETURN TO MENU
```

```
1240   RETURN
1250   !
1260 Lis_t:  !                    ****** LIST DATA FILES *******
1270   GOSUB Lister                              ! GOTO LIST 'CAT'
1280   GOSUB Pri_out                             ! GOTO PR-OUT
1290   INPUT "IS THIS THE RIGHT DATA FILE (Y/N)?",A1$
1300   A1$=LWC$(A1$)
1310   IF (A1$="n") THEN Lis_t
1320   !
1330   INPUT "DO YOU WISH TO LOOK AT ANOTHER DATA FILE (Y/N)?",A3$
1340   A3$=LWC$(A3$)
1350   IF (A3$="y") THEN Lis_t                   ! TRY AGAIN
1360   !
1370   GOTO Menu                                 ! GOTO MENU
1380   RETURN
1390   !
1400 Hard:  !                    ****** HARD COPY ROUTINE ********
1410   !
1420   INPUT "DO YOU WANT A HARD COPY (Y/N) ?",A$
1430   A$=LWC$(A$)
1440   IF A$="n" THEN RETURN
1450   PRINTER IS 701
1460   GOSUB Pri_out
1470   GOSUB Pri_out_n
1480   PRINTER IS 1
1490   RETURN
1500   !
1510 Del_t:  !                   ****** DELETE DATA FILES ******
1520   GOSUB Lister                              ! GOTO LIST 'CAT'
1530   GOSUB Pri_out                             ! GOTO PR-OUT
1540   INPUT "IS THIS THE FILE YOU WISH TO DELETE (YES,NO, OR STOP)?",B$
1550   B$=LWC$(B$)
1560   IF (B$="no") THEN Del_t
1570   IF (B$="stop") THEN Menu
1580   ASSIGN @File1 TO *
1590   PURGE Temp$
1600   INPUT "DO YOU WISH TO DELETE ANOTHER DATA FILE (Y/N)?",A$
1610   A$=LWC$(A$)
1620   IF (A$="y") THEN Del_t                    ! TRY AGAIN
1630   !
1640   GOTO Menu                                 ! RETURN TO MENU
1650   RETURN
1660   !
1670 Lister:PRINT "******************** LIST DATA FILES ******************"
1680   CAT
1690   INPUT "ENTER DATA FILE NAME REQUIRED",Temp$
1700   PRINT
1710   ASSIGN @File1 TO Temp$
1720   ENTER @File1;Temp$,Cutmat,D,Rad,Ds,Fl,Helex,Rk,Oal,N,Cut_type,Rpm,Sfm,Ft,F
,Adc,Rdc,Cdir,Cutfl,Mt,Ksi,Surf,Mac,Mac$,Mhp,Spld,Mrpm,Fix,Macc
1730   !
1740   RETURN
1750   !
1760 Err_r:  !******************* ERROR TRAP ROUTINE ***************
1770   !
1780   SELECT ERRN
1790   CASE =56
1800     DISP CHR$(129);"DATA FILE NOT FOUND, PRESS CONT. AND TRY AGAIN";CHR$(128
)
1810     PAUSE
1820     GOTO Lister
1830   CASE ELSE
1840     DISP ERRM$
1850   END SELECT
1860   !
1870   PAUSE
1880   RETURN
1890   !
1900 St_data: ! ****************** SUB STORE DATA ********************
1910   !
1920   INPUT "DO YOU WANT TO STORE THIS DATA ? (Y/N)",X$
1930   X$=LWC$(X$)
1940   IF (X$="y") THEN R_7
```

```
1950  RETURN
1960  !
1970 Res_tore: ! ****************** SUB RE-STORE DATA **********************
1980  !
1990  INPUT "DO YOU WANT TO RE-STORE THIS DATA ? (Y/N)",X$
2000  X$=LWC$(X$)
2010  IF (X$="n") THEN RETURN
2020 R_5:  !
2030  PRINT "DO YOU WANT TO CHANGE THE DATA FILE NAME ?(Y/N) IT IS NOW ";Temp$
2040  PRINT
2050  INPUT A$
2060  A$=LWC$(A$)
2070  IF A$="n" THEN R_6
2080  INPUT "ENTER THE NEW FILE NAME (10 CHARACTERS MAX, NO DECIMALS)",Temp$
2090  IF LEN(File$)>10 THEN R_7_1
2100  GOTO R_7
2110  !
2120 R_6:  !
2130  PURGE Temp$
2140 R_7:  !
2150  CREATE BDAT Temp$,35,10
2160  ASSIGN @File1 TO Temp$
2170  OUTPUT @File1;Temp$,Cutmat,D,Rad,Ds,Fl,Helex,Rk,Oal,N,Cut_type,Rpm,Sfm,Ft,
F,Adc,Rdc,Cdir,Cutfl,Mt,Ksi,Surf,Mac,Mac$,Mhp,Spld,Mrpm,Fix,Macc
2180  RETURN
2190  !
2200 R_7_1:  ! **********************************************************
2210  PRINT CHR$(129);"ENTER 10 CHARACTERS MAXIMUM, PLEASE";CHR$(128)
2220  GOTO R_6
2230  !
2240 R_8:  ! **********************************************************
2250  PRINT CHR$(129);"ENTER 1,2,3,4,5,6, OR 7  PLEASE";Chr(128)
2260  GOTO Menu
2270  !
2280  ! ***************** SUB ENTER NEW DATA *********************
2290  ! SUBROUTINE "ENTER"    BY D.A.ANDERSON 9/5/83,1/26/84,5/17/84
2300 Enter:  !
2310  !
2320  PRINT "ENTER DATA FILE NAME (10 CHARACTERS MAX, NO DECIMALS)"
2330  PRINT
2340  PRINT TAB(45);"PREVIOUS DATA FILE NAME=";Temp$
2350  PRINT
2360  INPUT Temp$
2370  IF LEN(Temp$)<=10 THEN R_9
2380  PRINT "ENTER 10 LETTERS OR LESS, PLEASE"
2390  PRINT
2400  GOTO Enter
2410  !
2420 R_9:  !
2430  PRINT "ENTER TOOL MATERIAL (1,2 or 3): 1.) H.S.S."
2440  PRINT "                                2.) COBALT"
2450  PRINT "                                3.) CARBIDE"
2460  PRINT
2470  PRINT TAB(45);"VALUE PREVIOUSLY ENTERED=";Cutmat
2480  PRINT
2490  INPUT Cutmat
2500  IF (Cutmat<1) OR (Cutmat>3) THEN R_24
2510  PRINT "ENTER CUTTING TOOL SPECIFICATIONS, SEPERATED BY COMMAS-AS:"
2520  PRINT "(DIAMETER,FLUTE LENGTH,OVERALL LENGTH,SHANK DIAMETER,RADIUS)"
2530  PRINT
2540  PRINT TAB(25);"VALUE PREVIOUSLY ENTERED=";D;"x";Fl;"x";Oal;"x";Ds;"x";Rad
2550  PRINT
2560  INPUT D,Fl,Oal,Ds,Rad
2570  PRINT "ENTER NUMBER OF TEETH"
2580  PRINT
2590  PRINT TAB(45);"VALUE PREVIOUSLY ENTERED=";N
2600  PRINT
2610  INPUT N
2620  PRINT "ENTER TOOL HELEX"
2630  PRINT
2640  PRINT TAB(45);"VALUE PREVIOUSLY ENTERED=";Helex
2650  PRINT
2660  INPUT Helex
```

```
2670  PRINT "ENTER TOOL RAKE ANGLE"
2680  PRINT
2690  PRINT TAB(45);"VALUE PREVIOUSLY ENTERED=";Rk
2700  PRINT
2710  INPUT Rk
2720 R_10:  !
2730  PRINT "ENTER TYPE OF CUT (1,2,3,or 4), 1.) SLOT"
2740  PRINT "                                 2.) SLAB"
2750  PRINT "                                 3.) FACE"
2760  PRINT "                                 4.) PERF."
2770  PRINT
2780  PRINT TAB(45);"VALUE PREVIOUSLY ENTERED=";Cut_type
2790  PRINT
2800  INPUT Cut_type
2810  IF (Cut_type<1) OR (Cut_type>4) THEN R_25
2820  !
2830  IF Flag=0 THEN R_11
2840  !
2850  PRINT "ENTER REVOLUTIONS PER MINUTE "
2860  PRINT
2870  PRINT TAB(45);"VALUE PREVIOUSLY ENTERED=";Rpm
2880  PRINT
2890  INPUT Rpm
2900  Sfm=PI*D*(Rpm/12)
2910  PRINT "ENTER SURFACE FEET PER MINUTE"
2920  PRINT
2930  PRINT TAB(45);"VALUE PREVIOUSLY ENTERED=";Sfm
2940  PRINT
2950  INPUT Sfm
2960  Rpm=12*Sfm/(PI*D)
2970  PRINT "ENTER INCHES PER MINUTE (IPM) "
2980  PRINT
2990  PRINT TAB(45);"VALUE PREVIOUSLY ENTERED=";F
3000  PRINT
3010  INPUT F
3020  Ft=F/(N*Rpm)
3030  PRINT "ENTER FEED PER TOOTH (INCHES) "
3040  PRINT
3050  PRINT TAB(45);"VALUE PREVIOUSLY ENTERED=";Ft
3060  PRINT
3070  INPUT Ft
3080  F=Ft*N*Rpm
3090  !
3100 R_11:  !
3110  !
3120  PRINT "ENTER AXIAL DEPTH OF CUT (INCHES)"
3130  PRINT
3140  PRINT TAB(45);"VALUE PREVIOUSLY ENTERED=";Adc
3150  PRINT
3160  INPUT Adc
3170  IF Adc<=Fl THEN 3200
3180  PRINT CHR$(129);"AXIAL DEPTH IS GREATER THAN FLUTE LENGTH,CHANGE AXIAL DEPTH; PLEASE";CHR$(128)
3190  GOTO 3120
3200  IF Cut_type>1 THEN R_12
3210  Rdc=D
3220  Aaa=2
3230  GOTO R_13
3240 R_12:  !
3250  PRINT "ENTER RADIAL DEPTH OF CUT (INCHES)"
3260  PRINT
3270  PRINT TAB(45);"VALUE PREVIOUSLY ENTERED=";Rdc
3280  PRINT
3290  INPUT Rdc
3300  IF Rdc<=D THEN R_13
3310  PRINT CHR$(129);"RADIAL DEPTH IS GREATER THAN DIAMETER, CHANGE RADIAL DEPTH; PLEASE";CHR$(128)
3320  GOTO R_12
3330 R_13:  !
3340  PRINT "ENTER DIRECTION OF CUT (1 or 2).  1.) CLIMB"
3350  PRINT "                                  2.) CONVENTIONAL"
3360  PRINT
```

```
3370 R_14:   !
3380   PRINT TAB(45);"VALUE PREVIOUSLY ENTERED=";Cdir
3390   PRINT
3400   INPUT Cdir
3410   IF (Cdir<1) OR (Cdir>2) THEN R_26
3420 R_15:   !
3430   PRINT "ENTER CUT CONDITION (1 OR 2). 1.) ROUGHING"
3440   PRINT "                                2.) FINISH"
3450   PRINT
3460   PRINT TAB(45);"VALUE PREVIOUSLY ENTERED=";Surf
3470   PRINT
3480   INPUT Surf
3490   IF Surf>2 THEN R_27
3500 R_16:   !
3510   PRINT "ENTER TYPE OF COOLANT (1 or 2).  1.) WATER SOLUBLE"
3520   PRINT "                                 2.) DRY"
3530   PRINT
3540   PRINT TAB(45);"VALUE PREVIOUSLY ENTERED=";Cutfl
3550   PRINT
3560   INPUT Cutfl
3570   IF (Cutfl<1) OR (Cutfl>2) THEN R_28
3580 R_17:   !
3590   PRINT "ENTER MATERIAL TO BE CUT (1,2,3,or 4): 1.) ALUMINUM"
3600   PRINT "                                       2.) ALLOY STEEL"
3610   PRINT "                                       3.) TITANIUM"
3620   PRINT "                                       4.) STAINLESS"
3630   PRINT
3640   PRINT TAB(45);"VALUE PREVIOUSLY ENTERED=";Mt
3650   PRINT
3660   INPUT Mt
3670   IF (Mt<1) OR (Mt>4) THEN R_29
3680   IF Mt=1 THEN R_18
3690   IF Mt>=2 THEN R_19
3700 R_18:   !
3710   PRINT "ENTER TYPE OF ALUMINUM (1 or 2): 1.) 6061-T4 (40 Ksi)"
3720   PRINT "                                 2.) 7075 (90 Ksi)"
3730   PRINT
3740   PRINT TAB(45);"VALUE PREVIOUSLY ENTERED=";Aaa
3750   PRINT
3760   INPUT Aaa
3770   IF (Aaa<1) OR (Aaa>2) THEN R_30
3780   SELECT Aaa
3790   CASE =1
3800      Ksi=40
3810   CASE =2
3820      Ksi=90
3830   END SELECT
3840   GOTO R_20
3850 R_19:   !
3860   PRINT "ENTER HARDNESS OF MATERIAL (KSI)"
3870   PRINT
3880   PRINT TAB(45);"VALUE PREVIOUSLY ENTERED=";Ksi
3890   PRINT
3900   INPUT Ksi
3910 R_20:   !
3920   PRINT "ENTER MACHINE TYPE (ENTER 1,2,3,OR 4); 1.) OM-2"
3930   PRINT "                                       2.) CINC (VERSIPOWER)"
3940   PRINT "                                       3.) FMS "
3950   PRINT "                                       4.) OTHER"
3960   PRINT
3970   PRINT TAB(45);"VALUE PREVIOUSLY ENTERED=";Mac
3980   PRINT
3990   INPUT Mac
4000   IF (Mac<1) OR (Mac>4) THEN R_31
4010   !
4020   SELECT Mac
4030   CASE =1
4040      Mhp=15
4050      Spld=1500
4060      Mrpm=4000
4070      Macc=10
4080   CASE =2
4090      Mhp=50
```

```
4100      Spld=5000
4110      Mrpm=1500
4120      Macc=10
4130   CASE =3
4140      Mhp=30
4150      Spld=3000
4160      Mrpm=5000
4170      Macc=10
4180   CASE =4
4190 R_21:  !
4200      PRINT "ENTER MACHINE TYPE (6 LETTERS OR NUMBERS ONLY)"
4210      PRINT
4220      PRINT TAB(45);"VALUE PREVIOUSLY ENTERED=";Mac$
4230      PRINT
4240      INPUT Mac$
4250      IF LEN(Mac$)>6 THEN R_32
4260      PRINT "ENTER MACHINE MAX. HORSEPOWER"
4270      PRINT
4280      PRINT TAB(45);"VALUE PREVIOUSLY ENTERED=";Mhp
4290      PRINT
4300      INPUT Mhp
4310      PRINT "ENTER MACHINE MAX. SPINDLE LOAD (FOOT-POUNDS)"
4320      PRINT
4330      PRINT TAB(45);"VALUE PREVIOUSLY ENTERED=";Spld
4340      PRINT
4350      INPUT Spld
4360      PRINT "ENTER MACHINE MAX. RPM"
4370      PRINT
4380      PRINT TAB(45);"VALUE PREVIOUSLY ENTERED=";Mrpm
4390      PRINT
4400      INPUT Mrpm
4410   END SELECT
4420 R_22:  !
4430     PRINT "ENTER MACHINE CONDITION (SELECT 1-10 WITH 10 BEING RIGID)"
4440     PRINT
4450     PRINT TAB(45);"VALUE PREVIOSLY ENTERED=";Macc
4460     PRINT
4470     INPUT Macc
4480     IF (Macc<1) OR (Macc>10) THEN R_33
4490   !
4500 R_23:  !
4510     PRINT "ENTER FIXTURE CONDITION (SELECT 1-10 WITH 10 BEING RIGID)"
4520     PRINT
4530     PRINT TAB(45);"VALUE PREVIOUSLY ENTERED=";Fix
4540     PRINT
4550     INPUT Fix
4560     IF (Fix<1) OR (Fix>10) THEN R_34
4570   !
4580   GOSUB Pri_out                              !GOTO PR-OUT
4590   INPUT "IS THIS CORRECT ? (Y/N) ",A$
4600   A$=LWC$(A$)
4610   IF A$="n" THEN Enter
4620   RETURN
4630   !
4640 ! THIS IS MISC. SUB-ROUTINES
4650 R_24:  !
4660   PRINT CHR$(129);"ENTER 1,2 OR 3: PLEASE";CHR$(128)
4670   GOTO R_9
4680 R_25:  !
4690   PRINT CHR$(129);"ENTER 1,2,3, OR 4: PLEASE";CHR$(128)
4700   GOTO R_10
4710 R_26:  !
4720   PRINT CHR$(129);"ENTER 1 OR 2: PLEASE";CHR$(128)
4730   GOTO R_13
4740 R_27:  !
4750   PRINT CHR$(129);"ENTER 1 OR 2: PLEASE";CHR$(128)
4760   GOTO R_15
4770 R_28:  !
4780   PRINT CHR$(129);"ENTER 1 OR 2: PLEASE";CHR$(128)
4790   GOTO R_16
4800 R_29:  !
4810   PRINT CHR$(129);"ENTER 1,2,3, OR 4: PLEASE";CHR$(128)
```

```
4820   GOTO R_17
4830 R_30:  !
4840   PRINT CHR$(129);"ENTER 1 OR 2: PLEASE";CHR$(128)
4850   GOTO R_18
4860 R_31:  !
4870   PRINT CHR$(129);"ENTER 1,2,3 OR 4: PLEASE";CHR$(128)
4880   GOTO R_20
4890 R_32:  !
4900   PRINT CHR$(129);"ENTER UP TO 6 DIGITS OR LETTERS, ONLY!";CHR$(128)
4910   GOTO R_21
4920 R_33:  !
4930   PRINT CHR$(129);"ENTER 1,2,3,4,5,6,7,8,9,OR 10: PLEASE";CHR$(128)
4940   GOTO R_22
4950 R_34:  !
4960   PRINT CHR$(129);"ENTER 1,2,3,4,5,6,7,8,9,OR 10: PLEASE";CHR$(128)
4970   GOTO R_23
4980   !
4990   !
5000 Calc: ! **************** THIS CALCULATES DATA **********************
5010   ! SUBROUTINE "CALC"   BY D.A.ANDERSON 9/5/83,1/26/84,3/29/84,4/9/84,5/17/
84,6/29/84,9/11/84,10/30/84(Hp),1/30/85(CONSTANTS),3/19/85(HP),5/14/85
5020   !
5030   ! THE INFORMATION CONTAINED HEREIN IS PROPRIETARY TO THE BOEING
5040   ! COMPANY AND SHALL NOT BE REPRODUCED OR DISCLOSED IN WHOLE OR IN
5050   ! PART OR USED FOR ANY PURPOSE WITHOUT WRITTEN AUTHORIZATION FROM
5060   ! THE BOEING COMPANY.
5070   !
5080   Try=0   ! ************** FOR SECOND RUN THRU IMPACT FORCE FORMULA
5090   Rd2=Rdc/D
5100   D2=D/2
5110   Ad1=Adc/D
5120   Ad2=Adc/2
5130   F12=F1/D
5140   F13=Adc/F1
5150   Coshel=COS(Helex*.0175)
5160   Bhn=INT(1.929*Ksi+12.714)   ! *** KSI TO BHN CONVERSION
5170   Hstar=Bhn*.0044+.1          ! ******** HARDNESS FACTOR
5180   !
5190   !
5200   SELECT Mt
5210   CASE =1                ! ********* ALUMINUM
5220     Pf=.33
5230     M=10
5240     IF D<=.7 THEN
5250       Cf1=12050
5260     ELSE
5270       Cf1=10050
5280     END IF
5290   CASE =2                ! ********* ALLOY STEEL
5300     Pf=.7
5310     M=.3
5320     IF D<=.7 THEN
5330       Cf1=18300
5340     ELSE
5350       Cf1=23300
5360     END IF
5370   CASE =3                ! ********* TITANIUM
5380     Pf=1.1
5390     M=.25
5400     IF D<=.7 THEN
5410       Cf1=18750
5420     ELSE
5430       Cf1=24650
5440     END IF
5450   CASE =4                ! ********* STAINLESS
5460     Pf=1.5
5470     M=.2
5480     IF D<=.7 THEN
5490       Cf1=20650
5500     ELSE
5510       Cf1=25650
5520     END IF
5530   END SELECT
```

```
5540  !                         ******************* CONVERSION FOR CUT TYPE
5550  IF Cut_type>1 THEN
5560     Cf=Cf1
5570  ELSE
5580     Cf=Cf1-2550
5590  END IF
5600  !                         ********************* SELECT CONSTANTS
5610  Cutmt=Cutmat
5620  SELECT Cutmt
5630  CASE =1
5640     RESTORE Hs_s
5650  CASE =2
5660     RESTORE Cob_alt
5670  CASE =3
5680     RESTORE Ca_rb
5690  CASE =4
5700     RESTORE Carb_i
5710  END SELECT
5720  !
5730  Hs_s:DATA 49000,3E7,5810,107000         !** HIGH SPEED STEEL
5740  Cob_alt:DATA 44000,3.05E7,6810,100000   !** COBALT HIGH SPEED
5750  Ca_rb:DATA 35000,4E7,2492,90000         !** CARBIDE (C2)
5760  Carb_i:DATA 35000,4E7,2492,120000       !** CARBIDE INSERTS
5770  !
5780  READ Yield,Young,Confac,Tens
5790  !
5800  IF Flag=1 THEN R_35
5810  !
5820  SELECT Mt
5830  CASE =1
5840  Alum_m: ! *************** ALUMINUM
5850     Fideal=.009
5860     SELECT Surf
5870     CASE =1
5880        SELECT Cutmat
5890        CASE =1
5900           Sideal=1000
5910        CASE =2
5920           Sideal=1500
5930        CASE >=3
5940           Sideal=3000
5950        END SELECT
5960     CASE ELSE
5970        SELECT Cutmat
5980        CASE =1
5990           Sideal=2000
6000        CASE =2
6010           Sideal=2500
6020        CASE >=3
6030           Sideal=4800
6040        END SELECT
6050     END SELECT
6060  !
6070  CASE =2
6080  Alloy_s: ! ******************************* ALLOY STEEL
6090  !
6100  Bhn250:DATA .0050,.0060,70,325,100,430
6110  Bhn275:DATA .0048,.0057,62,265,87,350
6120  Bhn300:DATA .0046,.0054,55,205,77,275
6130  Bhn325:DATA .0044,.0050,52,185,70,245
6140  Bhn350:DATA .0042,.0048,48,160,64,215
6150  Bhn375:DATA .0035,.0042,44,145,58,195
6160  Bhn400:DATA .0030,.0036,40,130,53,175
6170  Bhn425:DATA .0025,.0030,37,120,49,160
6180  Bhn450:DATA .0020,.0024,34,110,45,145
6190  Bhn475:DATA .0015,.0018,32,95,42,132
6200  Bhn500:DATA .0010,.0012,30,90,40,120
6210  !
6220     SELECT Bhn
6230     CASE <275
6240        RESTORE Bhn250
6250     CASE =275,<300
```

```
6260        RESTORE Bhn275
6270      CASE =300,<325
6280        RESTORE Bhn300
6290      CASE =325,<350
6300        RESTORE Bhn325
6310      CASE =350,<375
6320        RESTORE Bhn350
6330      CASE =375,<400
6340        RESTORE Bhn375
6350      CASE =400,<425
6360        RESTORE Bhn400
6370      CASE =425,<450
6380        RESTORE Bhn425
6390      CASE =450,<475
6400        RESTORE Bhn450
6410      CASE =475,<500
6420        RESTORE Bhn475
6430      CASE >=500
6440        RESTORE Bhn500
6450      END SELECT
6460    !
6470      READ Fth,Ftc,Sfmhr,Sfmcr,Sfmhf,Sfmcf
6480    !
6490      IF Cutmat<=2 THEN    ! ******************** GET Sideal AND Fideal
6500        Fideal=Fth
6510      ELSE
6520        Fideal=Ftc
6530      END IF
6540    !
6550      IF Surf=1 THEN                       ! ROUGHING CUT
6560        IF Cutmat<=2 THEN                  ! HSS OR COBALT TOOL
6570          Sideal=Sfmhr                     ! HSS TOOL ROUGHING CUT
6580        ELSE
6590          Sideal=Sfmcr                     ! CARBIDE TOOL ROUGHING CUT
6600        END IF
6610      ELSE                                 ! FINISH CUT
6620        IF Cutmat<=2 THEN                  ! HSS OR COBALT TOOL
6630          Sideal=Sfmhf                     ! HSS TOOL   FINISH CUT
6640        ELSE
6650          Sideal=Sfmcf                     ! CARBIDE TOOL  FINISH CUT
6660        END IF
6670      END IF
6680    CASE =3
6690 Tin_m:   ! ************* TITANIUM
6700      SELECT Surf
6710      CASE =1
6720        SELECT Cutmat
6730        CASE =1
6740          Sideal=35
6750          Fideal=.0055
6760        CASE =2
6770          Sideal=45
6780          Fideal=.0055
6790        CASE >=3
6800          Sideal=75
6810          Fideal=.0060
6820        END SELECT
6830      CASE ELSE
6840        SELECT Cutmat
6850        CASE =1
6860          Sideal=50
6870          Fideal=.0055
6880        CASE =2
6890          Sideal=60
6900          Fideal=.0055
6910        CASE >=3
6920          Sideal=90
6930          Fideal=.0055
6940        END SELECT
6950      END SELECT
6960    CASE =4         !     ************* STAINLESS
6970      SELECT Surf
6980      CASE =1
```

```
6990        SELECT Cutmat
7000          CASE <=2
7010            Sideal=60
7020            Fideal=.003
7030          CASE ELSE
7040            Sideal=200
7050            Fideal=.004
7060         END SELECT
7070       CASE ELSE
7080         SELECT Cutmat
7090          CASE <=2
7100            Fideal=.003
7110            Sideal=70
7120          CASE ELSE
7130            Fideal=.004
7140            Sideal=250
7150         END SELECT
7160       END SELECT
7170     END SELECT
7180   !
7190   R_35: !
7200   Fcs_f: !
7210     !                           ****** FORCE TO BREAK AT SHANK CALCULATION
7220     Rideal=12*Sideal/(PI*D)
7230     IF Flag=1 THEN Fideal=Ft
7240     !
7250     Fcs1=(Oal-Ad2)/Ds
7260     Fcs2=.3*Rd2^2
7270     Fcs3=Fcs2+(.3*(D/Ds)+.332)^2
7280     Fcs4=SQR(Fcs1^2+Fcs3)
7290     Fcs5=Yield*Ds^2
7300     Fcs=(Fcs5/(Fcs1+Fcs4))*1.3
7310     !
7320   Fcf_f: !
7330     !                           ****** FORCE TO BREAK AT FLUTE
7340     Kk=.0225-.0016*N+.00036*N^2
7350     V2=F12-Ad1*.5
7360     V3=Kk*D^2*10^6
7370     V4=SQR(V2^2+(.3*Rd2^2+12.9*Kk)^2)
7380     Fcf=V3/(V2+V4)
7390     !
7400   Fct_f: !
7410     !                           ****** IMPACT FORCE AT TEETH
7420     Fct=Tens*(Fideal^.139*D^.548*Adc^.89*N^.7/Bhn^.521)
7430     !
7440     IF Flag=1 THEN R_36
7450     !
7460     !                           ********* GET MIN. FORCE VALUE
7470     Fmax8=MIN(Fct,Fcs,Fcf,Spld)
7480     !
7490   Rpma_f:  !
7500     !                           ****** GET RPM FOR ALUMINUM
7510     SELECT Mt
7520     CASE =1
7530       IF Rdc=D THEN
7540         Rpm2=3120*F12^(.7857*F13-.4351)
7550       ELSE
7560         Rpm1=2550*F12^(.7857*F13-.4351)
7570         Rpm2=Rpm1*(2-Rd2)
7580       END IF
7590     CASE ELSE                   ! *** RPM MODIFIER FOR OTHER THAN ALUMINUM
7600     !
7610       Sfm2=Sideal*(.9618+.0608*F12-.0236*F13^2)
7620       Rpm2=12*Sfm2/(PI*D)
7630     END SELECT
7640     !
7650     !                           ************** MAX. RPM
7660     IF Rpm2>Mrpm THEN
7670       Rpm=Mrpm
7680     ELSE
7690       Rpm=Rpm2
7700     END IF
7710     !
```

```
7720  Sfm=PI*D*(Rpm/12)
7730  !
7740  Fts_f:  !
7750  !                           ***** MAX. F/T FOR SURFACE FINISH
7760  !
7770  SELECT Surf
7780  CASE =1
7790     Temp=100/(3.18*10^5)
7800  CASE ELSE
7810     Temp=63/(3.18*10^5)
7820  END SELECT
7830  SELECT Cdir
7840  CASE =1                !***************** CLIMB CUT
7850     Ff1=SQR(6.4846*N^2*Temp^2+32*(D/2)*Temp)
7860     Fpp1=.5*Ff1-4*Temp*N/PI
7870  CASE ELSE              !*****************CONVENTIONAL CUT
7880     Ff1=SQR(6.4846*N^2*Temp^2+32*(D/2)*Temp)
7890     Fpp1=4*Temp*N/(PI+.5*Ff1)
7900  END SELECT
7910  !
7920  Fpcomp:  !
7930  !          *************** FIXTURE/PART/MACHINE CONDITION MODIFICATION
7940  !
7950  Cond=MIN(Fix,Macc)
7960  Fix1=1-(Cond*.1)
7970  Fix2=3.5-(Cond*.1)
7980  IF Fix1=0 THEN
7990     Fmax=Fmax8
8000     Mhp5=Mhp
8010  ELSE
8020     Fmax=Fmax8-(Fmax8*Fix1)    ! MIN. FORCE AVAILABLE
8030     Mhp5=Mhp-(Mhp*Fix1)        ! MIN. Hp AVAILABLE
8040  END IF
8050  !
8060  Fpt1=ABS(Fpp1/Fix2)           ! F/T FOR SURFACE FINISH
8070  !
8080  Fthp_f:  !
8090  !                  **************** MAX F/T FOR HORSEPOWER AVAILABLE
8100  !                        CHANGED ON 10/30/84,3/25/85
8110  Hpa1=.106*Mhp5+1.772
8120  Hpa=Mhp5-Hpa1
8130  Cr=Rk*(-.0165)+.95
8140  IF Sfm<=800 THEN
8150     Cs=Sfm*(-.00066)+1.1
8160  ELSE
8170     Cs=.64
8180  END IF
8190  !
8200  Mf=Pf
8210  IF D<=.65 THEN Mf=Mf*2
8220  IF Cut_type=2 THEN
8230     Dr=Adc/D
8240  ELSE
8250     Dr=Rdc/D
8260  END IF
8270  IF Rdc<D2 THEN
8280     Bb1=2*Coshel*SQR(Dr*(1-Dr))
8290  ELSE
8300     Bb1=Coshel
8310  END IF
8320  Bb2=Rdc*Adc*Rpm*N
8330  Bb3=Mf*Cs*Cr*1.45*.565*Bb1*2
8340  Fpt2=((Hpa*Bb1^.125)/Bb3)^1.143
8350  !
8360  !
8370  Ftf_f:  !
8380  !                    ***** MAX F/T FOR MAX. FORCE AVAILABLE
8390  Ad6=Adc/(Coshel*.1785)
8400  N1=1.37/N
8410  A=.59*Rd2^N1
8420  Do1=Rd2^.263*N^.283*Hstar^.488*D^.231*Sfm^.1
8430  Fpt3=(Fmax*Rk^.65*.6/(Cf*Ad6^A*Do1))^2
8440  !
```

```
8450  !                              ***** SELECT MIN F/T
8460  Ft=MIN(Fpt1,Fpt2,Fpt3)
8470  IF Ft>.0005 THEN R_36
8480  PRINT "FEED PER TOOTH LESS THAN ";Ft;"  PRESS ";CHR$(129);"CONT";CHR$(128);" TO CONTINUE"
8490  !
8500 R_36: !
8510  IF Try=1 THEN R_37
8520  Fideal=Ft
8530  Sideal=Sfm
8540  Try=1
8550  GOTO R_35
8560  !
8570 R_37: !
8580  F=Ft*N*Rpm
8590  !
8600  !                              ! ***** METAL REMOVAL RATE
8610  Q=Rdc*Adc*Ft*N*Rpm
8620  !
8630  !                              ! ************** MAX. UNDEFORMED CHIP
8640  !
8650  IF Cut_type=2 THEN
8660     Dr=Adc/D
8670  ELSE
8680     Dr=Rdc/D
8690  END IF
8700  IF Rdc<D2 THEN
8710     Fm=2*Coshel*Ft*SQR(Dr*(1-Dr))
8720  ELSE
8730     Fm=Ft*Coshel
8740  END IF
8750  !
8760 Chp_f: !
8770  !                       ****** CUTTING HORSE POWER REQUIRED
8780  Cr=Rk*(-.0165)+.95
8790  IF Sfm<=800 THEN
8800     Cs=Sfm*(-.00066)+1.1
8810  ELSE
8820     Cs=.64
8830  END IF
8840  Ct=.565*(1/(Fm^.124))
8850  !
8860  H=Q*Pf*Cs*Ct*Cr*1.25
8870  !
8880 Crig_f: !
8890  !                       ****** CUTTER RIDIGITY
8900  SELECT N
8910  CASE =1
8920     Ee=100
8930  CASE <3
8940     Ee=96
8950  CASE <5
8960     Ee=86
8970  CASE <7
8980     Ee=75
8990  CASE <9
9000     Ee=65
9010  CASE >9.1
9020     Ee=55
9030  END SELECT
9040  !
9050  Rc1=Fl-Adc/5
9060  Rc=(8*Rc1^3+18*Adc*Rc1^2+12*Rc1*Adc^2+3*Adc^3)/24
9070  !
9080  !                       ****** TORQUE
9090  Tq=63025*H/Rpm
9100  !
9110 Cf_f: !
9120  !                       ****** ACTUAL CUTTING FORCE
9130  Ad6=Adc/(Coshel*.1785)
9140  N1=1.37/N
9150  A=.59*Rd2^N1
9160  A1=Cf*Ad6^A
```

```
9170  Fv=A1*Rd2^.263*N^.283*Hstar^.488*Ft^.439*D^.231*Sfm^.07/Rk^.65
9180  !
9190  Cdef_f:  !
9200  !                    ****** CUTTER DEFLECTION
9210  !
9220  Rc2=Young*D^4/Ee
9230  Cd1=Fv*Rc/Rc2
9240  IF D>.7 THEN
9250      Cd=Cd1
9260  ELSE
9270      Cd=Cd1*.6
9280  END IF
9290  !
9300  Ctl_f:  !
9310  !                    ****** TOOL LIFE
9320  W=.010                                        ! MAX. WEAR LAND ALLOWED
9330  IF Cdir=1 THEN
9340      P=1
9350  ELSE
9360      P=.28
9370  END IF
9380  IF Cutfl=1 THEN
9390      C=1
9400  ELSE
9410      C=.8
9420  END IF
9430  IF Cutmat<=2 THEN
9440      Tl1=W*M*C*10^7*P*D^2        !*********** COBALT & HSS TOOLS
9450      Tl2=Sfm^1.9*Fl2^.83*Ft^.62
9460      Tl3=N^.16*Bhn^1.2*Rd2^.56
9470      Tl=(Confac-Fv)*Tl1/(Tl2*Tl3)
9480  ELSE
9490      Tl1=W*M*C*10^7*P*D^1.8  !*********** CARBIDE & CARBIDE INSERTS
9500      Tl2=Sfm^1.8*Fl2^.83*Ft^.62
9510      Tl3=N^.16*Bhn^1.1*Rd2^.2
9520      Tl=(Confac-Fv)*Tl1/(Tl2*Tl3)
9530  END IF
9540  !
9550  Csur_f:  !
9560  !          ******************* SURFACE FINISH EXPECTED
9570  !
9580  SELECT Cdir
9590  CASE =1
9600      Suf=Rc*Rd2*Ft^2*Bhn^.52/(4*D2-Ft*N/PI)
9610  CASE ELSE
9620      Suf=Rc*Rd2*Ft^2*Bhn^72/(4*D2+Ft*N/PI)
9630  END SELECT
9640  Suff=Suf*3.18E+5
9650  !
9660  IF Flag=1 THEN R_40
9670  !           ****************** OVER-ACCEPTABLE FEED RATE TRAPS
9680  IF (Mt>1) AND (Ft>.0070) THEN R_38
9690  IF (Cd<=.055) AND (F<=100) THEN GOTO R_39
9700  R_38:  !
9710  IF Cd>=.0549 THEN Vx$="CUT. DEFL."
9720  IF F>=100 THEN Vx$="FEED RATE"
9730  IF (Mt>1) AND (Ft>.0070) THEN Vx$="F/T"
9740  Ft=Ft-.0005
9750  DISP "WORKING, ";Vx$;"     TOO HIGH"
9760  DISP USING Im_0;"CUT. DEF.=";Cd;"FEED/TOOTH=";Ft;"IPM=";F
9770  PRINT
9780  Im_0:IMAGE 11A,D.4D,4X,11A,X,D.4D,4X,4A,X,4D.2D
9790  BEEP
9800  GOTO R_37
9810  !
9820  R_39:  !
9830  IF Ft>=.0005 THEN R_40
9840  !
9850  PRINT "THIS CUT IS LESS THAN RECOMMENDED CHIP LOAD, CHANGE CUTTER OR"
9860  PRINT "AXIAL OR RADIAL DEPTHS OF CUT AND TRY AGAIN"
9870  PRINT
9880  !
```

```
9890 R_40:  !
9900  RETURN
9910  !
9920 Pri_out:! THIS PRINTS OUT INPUT DATA ****************************
9930  ! SUBROUTINE "PROUT1"  BY D.A.ANDERSON 9/5/83,1/26/84,3/29/84,4/9/84,5/18/84
9940  !
9950  SELECT Cutmat
9960  CASE =1
9970     Cutmat$="HSS"
9980  CASE =2
9990     Cutmat$="COBALT"
10000 CASE =3
10010    Cutmat$="CARB."
10020 END SELECT
10030 SELECT Cdir
10040 CASE =1
10050    Cdir$="CLIMB"
10060 CASE =2
10070    Cdir$="CONV."
10080 END SELECT
10090 SELECT Cutfl
10100 CASE =1
10110    Cutfl$="H2O SOL."
10120 CASE =2
10130    Cutfl$="DRY"
10140 END SELECT
10150 !
10160 SELECT Mt
10170 CASE =1
10180    Mt$="ALUMINUM"
10190 CASE =2
10200    Mt$="ALLOY STEEL"
10210 CASE =3
10220    Mt$="TITANIUM"
10230 CASE =4
10240    Mt$="STAINLESS"
10250 END SELECT
10260 !
10270 SELECT Cut_type
10280 CASE =1
10290    Cutty$="SLOT"
10300 CASE =2
10310    Cutty$="SLAB"
10320 CASE =3
10330    Cutty$="FACE"
10340 CASE =4
10350    Cutty$="PERF"
10360 END SELECT
10370 SELECT Surf
10380 CASE =1
10390    Surf$="ROUGHING"
10400 CASE =2
10410    Surf$="FINISH"
10420 END SELECT
10430 SELECT Mac
10440 CASE =1
10450    Mac$="OM-2"
10460 CASE =2
10470    Mac$="CINC"
10480 CASE =3
10490    Mac$="FMS"
10500 CASE =4
10510    Mac$=Mac$
10520 END SELECT
10530 !
10540 PRINT TAB(20),"************** INPUT DATA **************"
10550 PRINT "DATA FILE NAME IS ";Temp$
10560 PRINT
10570 PRINT TAB(22);"CUTTING TOOL SPECIFICATIONS"
10580 PRINT
```

```
10590 PRINT USING Im_1;Cutmat$;D;Fl;Oal;Ds;Rad
10600 PRINT USING Im_4;"NUMBER OF TEETH";N;"HELEX ANGLE IS";Helex;"RAKE ANGLE IS
";Rk
10610 PRINT
10620 PRINT TAB(26);"CUT PARAMETERS"
10630 PRINT USING Im_5;"CUT DIRECTION IS";Cdir$;"COOLANT IS";Cutfl$;"CUT TYPE IS
";Cutty$
10640 PRINT USING Im_6;"AXIAL DEPTH IS";Adc;"RADIAL DEPTH IS";Rdc;"CUT COND. IS"
;Surf$
10650 IF Flag=0 THEN R_43
10660 PRINT USING Im_10;"RPM IS";Rpm;"SFM IS";Sfm;"F/T IS";Ft;"IPM IS";F
10670 R_43: !
10680 PRINT
10690 PRINT TAB(19);"MATERIAL";TAB(57);"FIXTURE"
10700 PRINT USING Im_7;"MATERIAL IS";Mt$;"HARDNESS IS";Ksi;"COND. IS";Fix
10710 PRINT
10720 PRINT TAB(30);"MACHINE"
10730 PRINT USING Im_8;"TYPE IS";Mac$;"MAX. RPM IS";Mrpm;"MAX. HP. IS";Mhp
10740 PRINT USING Im_9;"MAX. SPINDLE LOAD IS";Spld;"MACHINE COND. IS";Macc
10750 PRINT
10760 PRINT
10770 RETURN
10780 !
10790 Pri_out_n: !
10800 PRINT TAB(20),"*********** OUTPUT DATA *************"
10810 PRINT
10820 !
10830 IF Flag=1 THEN R_45
10840 PRINT "********************************************************************
**********"
10850 PRINT "***                      RECOMMENDED SPEED AND FEED IS:
    ***"
10860 PRINT USING Im_10;"RPM IS";Rpm;"SFM IS";Sfm;"F/T IS";Ft;"IPM IS";F
10870 PRINT "********************************************************************
**********"
10880 PRINT
10890 R_45: !
10900 PRINT USING Im_11;"SHANK";Fcs
10910 PRINT USING Im_11;"FLUTE";Fcf
10920 PRINT USING Im_11;"TEETH";Fct
10930 PRINT
10940 PRINT USING Im_12;"CUTTING HORSEPOWER IS";H
10950 PRINT USING Im_12;"CUTTING TORQUE IS";Tq;"In. Lbs."
10960 PRINT USING Im_13;"METAL REMOVAL RATE IS";Q;"Cubic In./Min."
10970 PRINT USING Im_14;"MAX. UNDEFORMED CHIP IS";Fm;"Inches"
10980 PRINT USING Im_14;"TOOL DEFLECTION IS";Cd;"Inches"
10990 PRINT USING Im_12;"ACTUAL CUTTING FORCE IS";Fv;"Lbs"
11000 PRINT USING Im_15;"ESTIMATED TOOL LIFE IS";Tl;"inches"
11010 PRINT USING Im_15;"ESTIMATED SURFACE FINISH IS";Suff;"microinches"
11020 PRINT
11030 PRINT
11040 !
11050 ASSIGN @File1 TO *
11060 RETURN
11070 !
11080 Im_1:IMAGE "TOOL MATERIAL IS ",5A,2X,"TOOL DIM. ARE",4(X,2D.3D,X,"X"),X,D.
3D
11090 Im_2:IMAGE 8X,3(3A,"=",4D,7X),10A,"=",D.4D
11100 Im_3:IMAGE 13X,3A,"=",D.3D,3X,2(12A,"=",D.3D,3X)
11110 Im_4:IMAGE 3(16A,"=",X,2D,6X)
11120 Im_5:IMAGE 17A,5A,5X,11A,7A,5X,12A,4A
11130 Im_6:IMAGE 2(16A,X,D.3D,5X),13A,9A
11140 Im_7:IMAGE 12A,11A,3X,12A,3D,X,"KSI",8X,8A,X,2D
11150 Im_8:IMAGE 8A,6A,10X,12A,5D,8X,12A,3D
11160 Im_9:IMAGE 21A,5D,X,"Lbs.",8X,16A,X,2D
11170 Im_10:IMAGE "*** ",2(7A,5D,6X),7A,X,.4D,6X,7A,X,3D.2D,X,"***"
11180 Im_11:IMAGE "FORCE TO BREAK TOOL AT ",5A,X,"IS",X,8D,X,"Lbs."
11190 Im_12:IMAGE 25A,5X,4D.D,4X,8A
11200 Im_13:IMAGE 25A,6X,3D.4D,X,14A
11210 Im_14:IMAGE 25A,9X,.4D,X,6A
11220 Im_15:IMAGE 25A,4X,5D,6X,12A
11230 !
11240 En_d: !        ********** END PROGRAM **********
```

```
11250 INPUT "DO YOU WANT TO END THIS PROGRAM (Y/N)?",Z$
11260 Z$=LWC$(Z$)
11270 IF (Z$="n") THEN
11280   GOTO Menu
11290 ELSE
11300   DISP "********************* PROGRAM ENDED *********************"
11310 END IF
11320 PRINTER IS 1
11330 ASSIGN @File1 TO *
11340 RETURN
11350 !
11360 END
```

What is claimed is:

1. In a system having a machine with a cutter for cutting a metal workpiece and a fixture for mounting the workpiece, a method of adjusting the feed rate and cutting speed for a machining operation to the characteristics of the material to be cut, the cut to be made, the fixture, the cutter, and the machine, said method comprising:
   determining a first set of parameters, including a preliminary cutting speed and a preliminary feed rate, from the characteristics of the material to be cut, the cut to be made, the fixture, the cutter, and the machine;
   calculating the maximum allowable cutter force from the first set of parameters;
   calculating a base cutting speed from the first set of parameters;
   calculating the maximum feed rate from the first set of parameters, the maximum allowable cutter force, and the base cutting speed; and
   designating the calculated base cutting speed as the initial cutting speed, and the calculated maximum feed rate as the initial feed rate, for the machining operation.

2. A method as described in claim 1, in which the cutter is of the type having a shank and a cutting head that has flutes with cutting edge teeth; and in which the step of calculating the maximum allowable cutter force comprises calculating the force required to break the cutter at its shank, calculating the force required to break the cutter at its flutes, calculating the force required to fracture the teeth, and taking the minimum of the calculated forces and the maximum spindle load of the machine.

3. A method as described in claim 2, in which the step of calculating the maximum feed rate comprises calculating the maximum rate for the desired surface finish, calculating the maximum rate for the maximum available horsepower, calculating the maximum rate for the maximum force available, and taking the minimum of the calculated maximum rates.

4. A method as described in claim 3, further comprising calculating a second set of parameters from the first set of parameters, the designated cutting speed, and the designated feed rate; and, from the second set of parameters, the designated cutting speed, and the designated feed rate, determining how much time and what cutting tools the machining operation will require, to enable a planner to estimate production costs and schedules.

5. A method as described in claim 4, in which the second set of parameters includes cutter deflection, actual cutting force, estimated cutter life, and estimated surface finish.

6. A method as described in claim 5, in which the step of calculating the maximum allowable cutter force and the step of calculating the maximum feed rate each include correcting for the cutter condition, the fixture condition, and the machine condition.

7. A method as described in claim 4, in which the step of calculating the maximum allowable cutter force and the step of calculating the maximum feed rate each include correcting for the cutter condition, the fixture condition, and the machine condition.

8. A method as described in claim 3, in which the step of determining the first set of parameters includes converting the hardness of the metal to be cut from force per unit area to Brinell hardness; in which the force required to fracture the teeth is calculated from the converted hardness of the metal to be cut, characteristics of the cutter, and the preliminary feed rate; and in which the maximum rate for the maximum force available is calculated from characteristics of the metal to be cut, including the converted hardness thereof, and characteristics of the cutter and the cut to be made.

9. A method as described in claim 3, in which the step of calculating the maximum allowable cutter force and the step of calculating the maximum feed rate each include correcting for the cutter condition, the fixture condition, and the machine condition.

10. A method as described in claim 3, in which the step of calculating the maximum rate for the maximum available horsepower comprises converting the machine rated horsepower into spindle horsepower.

11. A method as described in claim 2, further comprising calculating a second set of parameters from the first set of parameters, the designated cutting speed, and the designated feed rate; and, from the second set of parameters, the designated cutting speed, and the designated feed rate, determining how much time and what cutting tools the machining operation will require, to enable a planner to estimate production costs and schedules.

12. A method as described in claim 11, in which the second set of parameters includes cutter deflection, actual cutting force, estimated cutter life, and estimated surface finish.

13. A method as described in claim 2, in which the step of determining the first set of parameters includes converting the hardness of the metal to be cut from force per unit area to Brinell hardness; and in which the force required to fracture the teeth is calculated from the converted hardness of the metal to be cut, characteristics of the cutter, and the preliminary feed rate.

14. A method as described in claim 2, in which the step of calculating the maximum allowable cutter force and the step of calculating the maximum feed rate each include correcting for the cutter condition, the fixture condition, and the machine condition.

15. A method as described in claim 1, in which the step of calculating the maximum feed rate comprises calculating the maximum rate for the desired surface finish, calculating the maximum rate for the maximum available horsepower, calculating the maximum rate for the maximum force available, and taking the minimum of the calculated maximum rates.

16. A method as described in claim 15, further comprising calculating a second set of parameters from the first set of parameters, the designated cutting speed, and the designated feed rate; and, from the second set of parameters, the designated cutting speed, and the designated feed rate, determining how much time and what cutting tools the machining operation will require, to enable a planner to estimate production costs and schedules.

17. A method as described in claim 16, in which the second set of parameters includes cutter deflection, actual cutting force, estimated cutter life, and estimated surface finish.

18. A method as described in claim 17, in which the step of calculating the maximum rate for the maximum available horsepower comprises converting the machine rated horsepower into spindle horsepower.

19. A method as described in claim 16, in which the step of calculating the maximum rate for the maximum available horsepower comprises converting the machine rated horsepower into spindle horsepower.

20. A method as described in claim 15, in which the step of determining the first set of parameters includes converting the hardness of the metal to be cut from force per unit area to Brinell hardness; and in which the maximum rate for the maximum force available is calculated from characteristics of the metal to be cut, including the converted hardness thereof, and characteristics of the cutter and the cut to be made.

21. A method as described in claim 15, in which the step of calculating the maximum allowable cutter force and the step of calculating the maximum feed rate each include correcting for the cutter condition, the fixture condition, and the machine condition.

22. A method as described in claim 15, in which the step of calculating the maximum rate for the maximum available horsepower comprises converting the machine rated horsepower into spindle horsepower.

23. A method as described in claim 1, further comprising calculating a second set of parameters from the first set of parameters, the designated cutting speed, and the designated feed rate; and, from the second set of parameters, the designated cutting speed, and the designated feed rate, determining how much time and what cutting tools the machining operation will require, to enable a planner to estimate production costs and schedules.

24. A method as described in claim 23, in which the second set of parameters includes cutter deflection, actual cutting force, estimated cutter life, and estimated surface finish.

25. A method as described in claim 22, in which the step of calculating the maximum allowable cutter force and the step of calculating the maximum feed rate each include correcting for the cutter condition, the fixture condition, and the machine condition.

26. A method as described in claim 23, in which the step of determining the first set of parameters includes converting the hardness of the metal to be cut from force per unit area to Brinell hardness; and the step of calculating the second set of parameters includes calculating cutter deflection, actual cutting force, estimated cutter life, and estimated surface finish.

27. A method as described in claim 23, in which the step of calculating the maximum allowable cutter force and the step of calculating the maximum feed rate each include correcting for the cutter condition, the fixture condition, and the machine condition.

28. A method as described in claim 1, in which the step of determining the first set of parameters includes converting the hardness of the metal to be cut from force per unit area to Brinell hardness.

29. A method as described in claim 1, in which the step of calculating the maximum allowable cutter force and the step of calculating the maximum feed rate each include correcting for the cutter condition, the fixture condition, and the machine condition.

30. A method as described in claim 1, further comprising, after calculating the maximum feed rate and before designating the cutting speed and feed rate for the machining operation:
resetting the preliminary cutting speed and the preliminary feed rate to equal the calculated base cutting speed and the calculated maximum feed rate, respectively; and
then, repeating the steps of calculating the maximum allowable cutter force, calculating the base cutting speed, and calculating the maximum feed rate.

31. In a system having a machine with a cutter for cutting a metal workpiece and a fixture for mounting the workpiece, a method of adjusting maximum limits on horsepower, torque, and cutting force for a machining operation to the characteristics of the metal to be cut, the cut to be made, the cutter, the fixture, and the machine, said method comprising:
selecting a fixed cutting speed and a fixed feed rate;
determining a set of parameters from the characteristics of the metal to be cut, the cut to be made, the cutter, the fixture, and the machine;
calculating cutting effects, including forces required to break the cutter, cutter deflection, actual cutting force, estimated cutter life, and estimated surface finish from the fixed cutting speed and feed rate and the set of parameters; and
determining said maximum limits for the machining operation from the calculated cutting effects.

32. A method as described in claim 31, in which the step of determining the set of parameters includes converting the hardness of the metal to be cut from force per unit area to Brinell hardness.

* * * * *

UNITED STATES PATENT AND TRADEMARK OFFICE
CERTIFICATE OF CORRECTION

PATENT NO. : 4,707,793

DATED : November 17, 1987

INVENTOR(S) : David A. Anderson

It is certified that error appears in the above-identified patent and that said Letters Patent are hereby corrected as shown below:

In the Abstract, 9th line from the end, "calculation" should be -- calculations --.

Column 1, line 37, "opeations" should be -- operations --.

Column 2, line 20, after "July 12, 1983,", -- to -- should be inserted.

Column 2, line 45, "and", second occurrence, should be -- are --.

Column 3, line 57, "of" should be -- to --.

Column 5, line 5, "most" should be -- mode --.

Column 49, line 57, (1st line of Claim 25), "22" should be -- 24 --.

Signed and Sealed this

Twenty-fourth Day of May, 1988

*Attest:*

DONALD J. QUIGG

*Attesting Officer*  *Commissioner of Patents and Trademarks*